(12) United States Patent
Wu et al.

(10) Patent No.: US 12,244,379 B2
(45) Date of Patent: Mar. 4, 2025

(54) CSI MEASUREMENT METHOD AND APPARATUS

(71) Applicant: HUAWEI TECHNOLOGIES CO., LTD., Guangdong (CN)

(72) Inventors: Ye Wu, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 415 days.

(21) Appl. No.: 17/343,200

(22) Filed: Jun. 9, 2021

(65) Prior Publication Data

US 2021/0297136 A1 Sep. 23, 2021

Related U.S. Application Data

(63) Continuation of application No. PCT/CN2019/124418, filed on Dec. 10, 2019.

(30) Foreign Application Priority Data

Dec. 10, 2018 (CN) .......................... 201811505572.X

(51) Int. Cl.
*H04B 7/06* (2006.01)
*H04B 1/713* (2011.01)
(Continued)

(52) U.S. Cl.
CPC ........... *H04B 7/0626* (2013.01); *H04B 1/713* (2013.01); *H04B 7/0456* (2013.01);
(Continued)

(58) Field of Classification Search
None
See application file for complete search history.

(56) References Cited

U.S. PATENT DOCUMENTS

2013/0083681 A1 4/2013 Ebrahimi Tazeh Mahalleh et al.
2013/0272257 A1* 10/2013 Takaoka ................ H04W 52/42
370/329
(Continued)

FOREIGN PATENT DOCUMENTS

CN 101841828 A 9/2010
CN 102546110 A 7/2012
(Continued)

OTHER PUBLICATIONS

3GPP TS 36.211 V15.3.0 (Sep. 2018), "3rd Generation Partnership Project; Technical Specification Group Radio Access Network;Evolved Universal Terrestrial Radio Access (E-UTRA); Physical channels and modulation(Release 15)," Sep. 2018, 237 pages.
(Continued)

*Primary Examiner* — Jay L Vogel
(74) *Attorney, Agent, or Firm* — Fish & Richardson P.C.

(57) ABSTRACT

This application provides a channel state information (CSI) measurement method and an apparatus. The method includes: A network device receives, from a terminal, a first reference signal (RS) used to measure uplink CSI and a second RS used to measure the uplink CSI. The first RS includes one or more RS ports, and the one or more RS ports correspond to one or more antenna ports of the terminal. Correspondingly, the second RS includes one or more RS ports, and the one or more RS ports also correspond to one or more antenna ports of the terminal. In addition, the one or more antenna ports, of the terminal, corresponding to the one or more RS ports included in the second RS are partially or completely the same as the one or more antenna ports, of the terminal, corresponding to the one or more RS ports included in the first RS.

19 Claims, 14 Drawing Sheets

(51) Int. Cl.
*H04B 7/0456* (2017.01)
*H04J 11/00* (2006.01)
*H04L 5/00* (2006.01)
*H04W 24/08* (2009.01)
*H04W 72/04* (2023.01)

(52) U.S. Cl.
CPC ........ *H04J 11/0033* (2013.01); *H04L 5/0048* (2013.01); *H04W 24/08* (2013.01); *H04W 72/04* (2013.01); *H04L 5/0016* (2013.01); *H04L 5/0023* (2013.01)

(56) References Cited

U.S. PATENT DOCUMENTS

| | | | |
|---|---|---|---|
| 2015/0009951 | A1 | 1/2015 | Josiam et al. |
| 2017/0303241 | A1* | 10/2017 | Yang ............... H04L 5/0053 |
| 2017/0331602 | A1* | 11/2017 | Hugl ............... H04W 72/1268 |
| 2019/0268185 | A1* | 8/2019 | Wang .............. H04L 27/2605 |
| 2020/0177416 | A1* | 6/2020 | Jiang .............. H04L 5/0051 |
| 2020/0186303 | A1* | 6/2020 | Hao ............... H04B 7/0626 |
| 2020/0389885 | A1* | 12/2020 | Tomeba ........... H04W 72/21 |

FOREIGN PATENT DOCUMENTS

| | | | |
|---|---|---|---|
| CN | 103069761 | A | 4/2013 |
| CN | 103368696 | A | 10/2013 |
| CN | 107547118 | A * | 1/2018 |
| CN | 107666341 | A | 2/2018 |
| CN | 107733563 | A | 2/2018 |
| CN | 108631847 | A | 10/2018 |
| CN | 108632008 | A | 10/2018 |
| WO | 2018222409 | A1 | 12/2018 |

OTHER PUBLICATIONS

Office Action issued in Chinese Application No. 201811505572.X on Aug. 17, 2021, 6 pages.
1 Extended European Search Report issued in European Application No. 19894826.7 on Dec. 7, 2021, 8 pages.
Ericsson, "TP for TR 37.842: Additions to section 4.3," TSG-RAN Working Group 4 (Radio) meeting #76bis, R4-156366, Sophia Antipolis, EU, Oct. 12-16, 2015, 4 pages.
Office Action issued in Chinese Application No. 201811505572.X on Feb. 24, 2021, 15 pages (with English translation).
PCT International Search Report and Written Opinion issued in International Application No. PCT/CN2019/124418 on Mar. 10, 2020, 15 pages (with English translation).

* cited by examiner

CSI MEASUREMENT METHOD AND APPARATUS

CROSS-REFERENCE TO RELATED APPLICATIONS

This application is a continuation of International Application No. PCT/CN2019/124418, filed on Dec. 10, 2019, which claims priority to Chinese Patent Application No. 201811505572.X, filed on Dec. 10, 2018. The disclosures of the aforementioned applications are hereby incorporated by reference in their entireties.

TECHNICAL FIELD

This application relates to the field of communications technologies, and in particular, to a channel state information (channel state information, CSI for short) measurement method and an apparatus.

BACKGROUND

In a current technology, a terminal may send a sounding reference signal (sound reference signal, SRS for short) to a base station, so that the base station obtains uplink CSI by using the received SRS, determines downlink CSI based on the uplink CSI, and further determines a precoding matrix based on the downlink CSI. Then, the base station precodes a physical downlink shared channel (physical downlink shared channel, PDSCH for short) based on the precoding matrix, and sends a precoded physical downlink shared channel to the terminal.

In a case, the terminal may periodically send the SRS. Assuming that a sending periodicity of the SRS is x milliseconds (ms), and a preparation time for the base station to send the PDSCH is y ms, as shown in FIG. 1, a maximum interval between a time for the base station to send the PDSCH and a time for the base station to receive the SRS is (x+y) ms. Once being configured, a value of x is fixed. A value of y is usually a fixed value. In this case, in a terminal mobility (mobility) scenario, because a channel between the terminal and the base station changes rapidly, the base station may obtain the uplink CSI through measurement by using the received SRS, and obtain the downlink CSI (denoted as first downlink CSI) through calculation based on the uplink CSI, the first downlink CSI has been far different from downlink CSI (denoted as second downlink CSI) that exists when the PDSCH is sent. Correspondingly, the precoding matrix determined based on the first downlink CSI is no longer a precoding matrix that best matches the second downlink CSI. In this case, receiving quality of receiving the PDSCH by the terminal deteriorates.

SUMMARY

Embodiments of this application provide a CSI measurement method and an apparatus, to improve receiving quality of receiving a PDSCH by a terminal.

To achieve the foregoing objective, the embodiments of this application provide the following technical solutions.

According to a first aspect, a CSI measurement method is provided, and includes: A network device receives, from a terminal, a first RS used to measure uplink CSI and a second RS used to measure the uplink CSI. The first RS includes one or more RS ports, and the one or more RS ports correspond to one or more antenna ports of the terminal. Correspondingly, the second RS also includes one or more RS ports, and the one or more RS ports also correspond to antenna ports of the terminal. In addition, the one or more antenna ports, of the terminal, corresponding to the one or more RS ports included in the second RS are partially or completely the same as the one or more antenna ports, of the terminal, corresponding to the one or more RS ports included in the first RS. The network device measures the uplink CSI based on the first RS or the second RS, or the network device measures the uplink CSI based on the first RS and the second RS. According to the method provided in the first aspect, the network device may measure the uplink CSI based on the first RS or the second RS, so that the network device can select, based on a requirement, an RS for measuring the uplink CSI, or can obtain, through joint measurement that is based on the first RS and the second RS, downlink CSI that exists when a PDSCH is sent, to obtain instantaneous CSI of the terminal in a terminal mobility scenario. Then, the network device determines a precoding matrix that better matches the current downlink CSI, and precodes, based on the precoding matrix, the PDSCH sent to the terminal, to avoid channel aging and improve receiving quality of receiving the PDSCH by the terminal.

In a possible implementation, that the one or more antenna ports, of the terminal, corresponding to the one or more RS ports included in the second RS are partially same as the one or more antenna ports, of the terminal, corresponding to the one or more RS ports included in the first RS means that a part of the RS ports included in the second RS respectively correspond to a part of the RS ports included in the first RS, that is, there is a one-to-one correspondence between a part of the RS ports included in the second RS and a part of the RS ports included in the first RS. Two RS ports that have a correspondence correspond to a same antenna port of the terminal. In this possible implementation, a problem, in a current technology, that joint measurement cannot be performed based on RSs can be resolved.

In a possible implementation, the method further includes: The network device sends, to the terminal, first indication information used to indicate an RS port included in the second RS. The RS port included in the second RS corresponds to an RS port included in the first RS. In this possible implementation, the network device sends the first indication information to the terminal, so that the terminal sends the first RS and second RS based on which joint measurement can be performed, and the network device performs joint measurement based on the first RS and the second RS.

In a possible implementation, the method further includes: The network device sends, to the terminal, second indication information used to indicate whether a correspondence is enabled. The correspondence is a correspondence between an RS port included in the first RS and an RS port included in the second RS. In this possible implementation, the network device sends the second indication information to the terminal, so that the terminal sends the first RS and second RS based on which joint measurement can be performed, and the network device performs joint measurement based on the first RS and the second RS.

In a possible implementation, that the one or more antenna ports, of the terminal, corresponding to the one or more RS ports included in the second RS are completely the same as the one or more antenna ports, of the terminal, corresponding to the one or more RS ports included in the first RS means that all the RS ports included in the second RS respectively correspond to all the RS ports included in the first RS, that is, there is a one-to-one correspondence between all the RS ports included in the second RS and all the RS ports included in the first RS. Two RS ports that have a correspondence correspond to a same antenna port of the terminal. In this possible implementation, a problem, in a current technology, that joint measurement cannot be performed based on RSs can be resolved.

In a possible implementation, one or more types of resources, such as a time domain resource, a frequency domain resource, and a code domain resource, occupied by the one or more RS ports included in the first RS are different from that or those occupied by the one or more RS ports included in the second RS.

In a possible implementation, a quantity of REs occupied by the one or more RS ports included in the second RS is less than or equal to a quantity of REs occupied by the one or more RS ports included in the first RS. In this possible implementation, resource overheads can be reduced, and it is ensured that instantaneous CSI in a terminal mobility scenario is obtained with low overheads.

In a possible implementation, the second RS performs frequency hopping in different time units at a frequency-domain granularity. In other words, on a frequency band obtained through division based on the frequency-domain granularity, and in different time units, the one or more RS ports included in the second RS occupy different frequency domain resources. In this possible implementation, communication interference can be evenly distributed on different time-frequency resources, thereby improving system performance.

In a possible implementation, in a same time unit, a frequency band obtained through division based on the frequency-domain granularity includes only one or more time-frequency resources occupied by a part of the RS ports included in the second RS. In this possible implementation, communication interference can be evenly distributed on different time-frequency resources, thereby improving system performance.

In a possible implementation, in a same time unit, one or more frequency domain resources occupied by the one or more RS ports included in the second RS are periodic. In other words, in a same time unit, one or more frequency domain resources occupied by the one or more RS ports included in the second RS are evenly distributed on bandwidth of the terminal.

In a possible implementation, one or more time domain resources occupied by the one or more RS ports included in the second RS are consecutive in two or more time units.

According to a second aspect, a CSI measurement method is provided, and includes: A terminal receives, from a network device, first indication information used to indicate an RS port included in a second RS. The RS port included in the second RS corresponds to an RS port included in a first RS, and two RS ports that have a correspondence correspond to a same antenna port of the terminal. The first RS is used to measure uplink CSI, and the second RS is also used to measure the uplink CSI. The terminal sends, on the same antenna port based on the first indication information, the first RS carried on a first resource and the second RS carried on a second resource. The first resource is a time-frequency resource occupied by the RS port included in the first RS, and the second resource is a time-frequency resource occupied by the RS port that is included in the second RS and that corresponds to the RS port included in the first RS. According to the method provided in the second aspect, the terminal sends the first RS and second RS based on which joint measurement can be performed, and the network device may obtain, through the joint measurement that is based on the first RS and the second RS, downlink CSI that exists when a PDSCH is sent, to obtain instantaneous CSI of the terminal in a terminal mobility scenario. Then, the network device determines a precoding matrix that better matches the current downlink CSI, and precodes, based on the precoding matrix, the PDSCH sent to the terminal, to avoid channel aging and improve receiving quality of receiving the PDSCH by the terminal.

According to a third aspect, a CSI measurement method is provided, and includes: A terminal receives, from a network device, second indication information used to indicate whether a correspondence is enabled. The correspondence is a correspondence between an RS port included in a first RS and an RS port included in a second RS, two RS ports that have a correspondence correspond to a same antenna port of the terminal, and both the first RS and the second RS are used to measure uplink CSI. When the second indication information indicates that the correspondence between the RS port included in the first RS and the RS port included in the second RS is enabled, the terminal sends, on a same antenna port based on the second indication information, the first RS carried on a first resource and the second RS carried on a second resource. The first resource is a time-frequency resource occupied by the RS port included in the first RS, and the second resource is a time-frequency resource occupied by the RS port that is included in the second RS and that corresponds to the RS port included in the first RS. According to the method provided in the third aspect, the terminal sends the first RS and second RS based on which joint measurement can be performed, and the network device may obtain, through the joint measurement that is based on the first RS and the second RS, downlink CSI that exists when a PDSCH is sent, to obtain instantaneous CSI of the terminal in a terminal mobility scenario. Then, the network device determines a precoding matrix that better matches the current downlink CSI, and precodes, based on the precoding matrix, the PDSCH sent to the terminal, to avoid channel aging and improve receiving quality of receiving the PDSCH by the terminal.

Based on the method provided in the second aspect or the third aspect, in a possible implementation, a part of RS ports included in the second RS respectively correspond to a part of RS ports included in the first RS, that is, there is a one-to-one correspondence between a part of RS ports included in the second RS and a part of RS ports included in the first RS. In this possible implementation, a problem, in a current technology, that joint measurement cannot be performed based on RSs can be resolved.

Based on the method provided in the second aspect or the third aspect, in a possible implementation, all RS ports included in the second RS respectively correspond to all RS ports included in the first RS, that is, there is a one-to-one correspondence between all RS ports included in the second RS and all RS ports included in the first RS. In this possible implementation, a problem, in a current technology, that joint measurement cannot be performed based on RSs can be resolved.

Based on the method provided in the second aspect or the third aspect, in a possible implementation, one or more types of resources, such as a time domain resource, a frequency domain resource, and a code domain resource, occupied by one or more RS ports included in the first RS are different from that or those occupied by one or more RS ports included in the second RS.

Based on the method provided in the second aspect or the third aspect, in a possible implementation, a quantity of REs occupied by one or more RS ports included in the second RS is less than or equal to a quantity of REs occupied by one or more RS ports included in the first RS. In this possible implementation, resource overheads can be reduced, and it is ensured that instantaneous CSI in a terminal mobility scenario is obtained with low overheads.

Based on the method provided in the second aspect or the third aspect, in a possible implementation, the second RS performs frequency hopping in different time units at a frequency-domain granularity. In other words, on a frequency band obtained through division based on the frequency-domain granularity, and in different time units, the one or more RS ports included in the second RS occupy different frequency domain resources. In this possible implementation, communication interference can be evenly distributed on different time-frequency resources, thereby improving system performance.

Based on the method provided in the second aspect or the third aspect, in a possible implementation, in a same time unit, a frequency band obtained through division based on the frequency-domain granularity includes only one or more time-frequency resources occupied by a part of the RS ports included in the second RS. In this possible implementation, communication interference can be evenly distributed on different time-frequency resources, thereby improving system performance.

Based on the method provided in the second aspect or the third aspect, in a possible implementation, in a same time unit, one or more frequency domain resources occupied by the one or more RS ports included in the second RS are periodic. In other words, in a same time unit, one or more frequency domain resources occupied by the one or more RS ports included in the second RS are evenly distributed on bandwidth of the terminal.

Based on the method provided in the second aspect or the third aspect, in a possible implementation, one or more time domain resources occupied by the one or more RS ports included in the second RS are consecutive in two or more time units.

According to a fourth aspect, a network device is provided, and the network device has a function of implementing any method provided in the first aspect. The function may be implemented by hardware, or may be implemented by hardware by executing corresponding software. The hardware or the software includes one or more units corresponding to the foregoing function. The network device may exist in a product form of a chip.

According to a fifth aspect, a terminal is provided, and the terminal has a function of implementing any method provided in the second aspect or the third aspect. The function may be implemented by hardware, or may be implemented by hardware by executing corresponding software. The hardware or the software includes one or more units corresponding to the foregoing function. The terminal may exist in a product form of a chip.

According to a sixth aspect, a network device is provided. The network device includes a memory, a processor, at least one communications interface, and a communications bus. The memory is configured to store computer-executable instructions. The processor, the memory, and the at least one communications interface are connected to each other through the communications bus. The processor executes the computer-executable instructions stored in the memory, to enable the network device to implement any method provided in the first aspect. The network device may exist in a product form of a chip.

According to a seventh aspect, a terminal is provided. The terminal includes a memory, a processor, at least one communications interface, and a communications bus. The memory is configured to store computer-executable instructions. The processor, the memory, and the at least one communications interface are connected to each other through the communications bus. The processor executes the computer-executable instructions stored in the memory, to enable the terminal to implement any method provided in the second aspect or the third aspect. The terminal may exist in a product form of a chip.

According to an eighth aspect, a chip is provided. The chip includes a processor, at least one communications interface, and a communications bus. The processor is connected to the at least one communications interface through the communications bus, and the processor executes computer-executable instructions stored in an external memory, to implement any method provided in the first aspect. The chip may exist in a network device.

According to a ninth aspect, a chip is provided. The chip includes a processor, at least one communications interface, and a communications bus. The processor is connected to the at least one communications interface through the communications bus, and the processor executes computer-executable instructions stored in an external memory, to implement any method provided in the second aspect. The chip may exist in a terminal.

According to a tenth aspect, a computer-readable storage medium is provided. The computer-readable storage medium includes instructions, and when the instructions are run on a computer, the computer is enabled to perform any method provided in the first aspect, the second aspect, or the third aspect.

According to an eleventh aspect, a computer program product including instructions is provided. When the computer program product runs on a computer, the computer is enabled to perform any method provided in the first aspect, the second aspect, or the third aspect.

According to a twelfth aspect, a communications system is provided, and includes the network device provided in the fourth aspect and the terminal provided in the fifth aspect, includes the network device provided in the sixth aspect and the terminal provided in the seventh aspect, or includes the chip provided in the eighth aspect and the chip provided in the ninth aspect.

For technical effects brought by any design in the fourth aspect to the twelfth aspect, refer to technical effects brought by corresponding designs in the first aspect to the third aspect. Details are not described herein again.

It should be noted that various possible implementations of any one of the foregoing aspects may be combined provided that the solutions are not contradictory.

DESCRIPTION OF EMBODIMENTS

Figure 1:
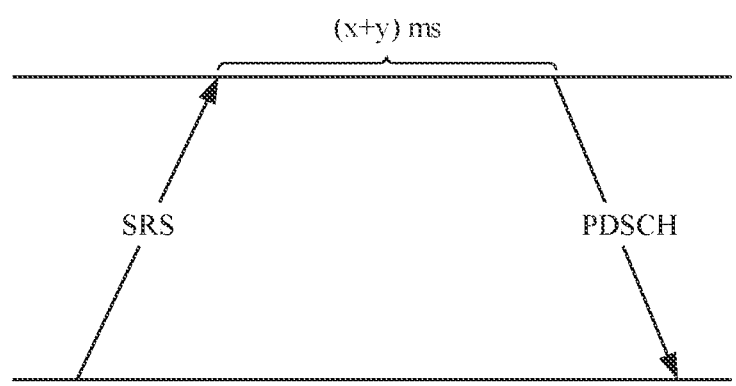
FIG. 1 is a schematic diagram of an interval between a time for a network device to receive an SRS and a time for the network device to send a PDSCH.

The following describes technical solutions in embodiments of this application with reference to the accompanying drawings in the embodiments of this application. In the descriptions of this application, "/" means "or" unless otherwise specified. For example, A/B may represent A or B. In addition, unless otherwise specified, "a plurality of" in the descriptions of this application means two or more than two. In addition, for convenience of clear description of the technical solutions in the embodiments of this application, in the embodiments of this application, terms such as "first" and "second" are used to distinguish between same objects or similar objects whose functions and purposes are basically the same. A person skilled in the art may understand that the terms such as "first" and "second" do not constitute a limitation on a quantity or an execution sequence, and that the terms such as "first" and "second" do not indicate a definite difference.

The technical solutions in the embodiments of this application may be applied to various communications systems, for example, orthogonal frequency division multiple access (orthogonal frequency-division multiple access, OFDMA for short), single-carrier frequency division multiple access (single carrier FDMA, SC-FDMA for short), and other systems. The terms "system" and "network" can be interchanged with each other. A radio technology such as evolved universal terrestrial radio access (evolved universal terrestrial radio access, E-UTRA for short) or ultra mobile broadband (ultra mobile broadband, UMB for short) may be implemented in the OFDMA system. The E-UTRA is an evolved version of a universal mobile telecommunications system (universal mobile telecommunications system, UMTS for short). The 3rd generation partnership project (3rd generation partnership project, 3GPP for short) uses a new version of the E-UTRA in long term evolution (long term evolution, LTE for short) and various versions evolved based on LTE. A 5th generation (5th-generation, 5G for short) communications system or new radio (new radio, NR for short) is a next generation communications system under research. The 5G mobile communications system includes a non-standalone (non-standalone, NSA for short) 5G mobile communications system, a standalone (standalone, SA for short) 5G mobile communications system, or both an NSA 5G mobile communications system and an SA 5G mobile communications system. In addition, the communications system may further be applicable to a future-oriented communications technology, and is applicable to the technical solutions provided in the embodiments of this application. The foregoing communications system to which this application is applicable is merely an example for description, and a communications system to which this application is applicable is not limited thereto. For example, the communications system may include another quantity of network devices and another quantity of terminal devices.

Network elements in the embodiments of this application include a network device and a terminal.

The network device may be an apparatus that is deployed in a radio access network (radio access network, RAN for short) and that provides a wireless communication function for a terminal, for example, may be a NodeB (node B, NB for short). The network device may include base stations in various forms, for example, a macro base station, a micro base station (also referred to as a small cell), a relay station, and an access point (access point, AP), or may include control nodes in various forms, for example, a network controller. The control node may be connected to a plurality of base stations, and configure resources for a plurality of terminals covered by the plurality of base stations. In systems using different radio access technologies, a device having a function of a base station may have different names, for example, an evolved NodeB (evolutional node B, eNB or e-NodeB for short) in LTE, or may be a base station or a transmit/receive end point in 5G or NR, for example, a gNB. This is not limited in this application.

The terminal in the embodiments of this application may alternatively be referred to as user equipment (user equipment, UE for short), a terminal device, an access terminal, a subscriber unit, a subscriber station, a mobile station, a remote station, a remote terminal, a mobile device, a user terminal, a wireless communications device, a user agent, or a user apparatus. The terminal may be a station (station, ST for short) in a wireless local area network (wireless local area networks, WLAN for short), or may be a cellular phone, a cordless phone, a session initiation protocol (session initiation protocol, SIP for short) phone, a wireless local loop (wireless local loop, WLL for short) station, a personal digital assistant (personal digital assistant, PDA for short) device, a handheld device having a wireless communication function, a computing device or another processing device connected to a wireless modem, a vehicle-mounted device, or a wearable device (which may also be referred to as a wearable intelligent device). The terminal may alternatively be a terminal in a next generation communications system, for example, a terminal in 5G, a terminal in a future evolved public land mobile network (public land mobile network, PLMN for short), or a terminal in an NR communications system.

As shown in FIG. 1, a schematic diagram of an interval between a time for a network device to receive an SRS and a time for the network device to send a PDSCH.

For ease of understanding of the embodiments of this application, the following first briefly describes related terms in this specification.

1. Slot (Slot)

In the NR communications system, for a normal (normal) cyclic prefix (cyclic prefix, CP for short), one slot includes 14 orthogonal frequency division multiplexing (orthogonal frequency-division multiplexing, OFDM for short) symbols. For an extended (extended) CP, one slot includes 12 OFDM symbols. In the embodiments of this application, an example in which one slot includes 14 OFDM symbols is used for description.

In one slot, 14 OFDM symbols are sequentially numbered in ascending order, where a minimum number is 0, and a maximum number is 13. In the embodiments of this application, an OFDM symbol whose index (namely, number) is i is denoted as an OFDM symbol #i. In this case, one slot includes an OFDM symbol #0 to an OFDM symbol #13.

A time domain unit may also be referred to as a time unit, a time-domain granularity, or the like.

2. Comb (Comb) Structure

The comb structure may be used to indicate a distribution manner of signals or data on a frequency domain resource. The signals or data distributed based on the comb structure are evenly distributed on the frequency domain resource at an equal interval. In other words, the signals or data distributed based on the comb structure are periodically distributed on the frequency domain resource. A periodicity of the signals or the data is a size of a comb, and may be denoted as K. A comb K (combK) indicates a comb structure with a periodicity of K. K is an integer greater than or equal to 1.

Figure 1A:
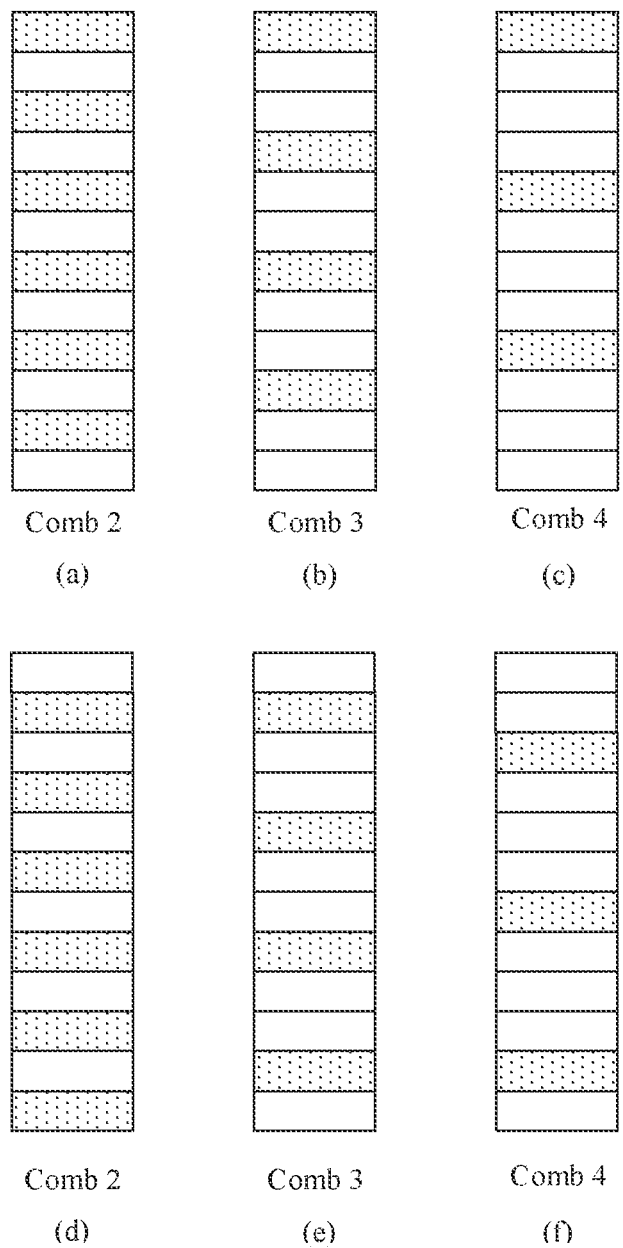
FIG. 1A is a schematic diagram of distribution of signals or data of comb structures in time-frequency resources.

For example, referring to FIG. 1A, for distribution, on a frequency domain resource, of signals or data distributed based on a comb 2, refer to (a) and (d) in FIG. 1A; for distribution, on a frequency domain resource, of signals or data distributed based on a comb 3, refer to (b) and (e) in FIG. 1A; and for distribution, on a frequency domain resource, of signals or data distributed based on a comb 4, refer to (c) and (f) in FIG. 1A.

In the background technology, inaccurate uplink CSI measurement due to fast changing of a channel causes a problem that a precoding matrix determined based on first downlink CSI is not a precoding matrix that best matches second downlink CSI, where the problem may be referred to as channel aging (channel aging). Due to the existence of channel aging, the effect of interference suppression by precoding is deteriorated. In a multi-user (multi-user, MU for short) scenario, channel aging greatly increases interference between multiple users.

In the following description, the "antenna port of the terminal" refers to a "physical antenna port of the terminal", and the "RS port" refers to a "logical port used to send an RS". The "RS port whose index is i" is briefly described as an "RS port i". The "RS set" may also be described as an "RS resource set (RS resource set)".

Figure 2:
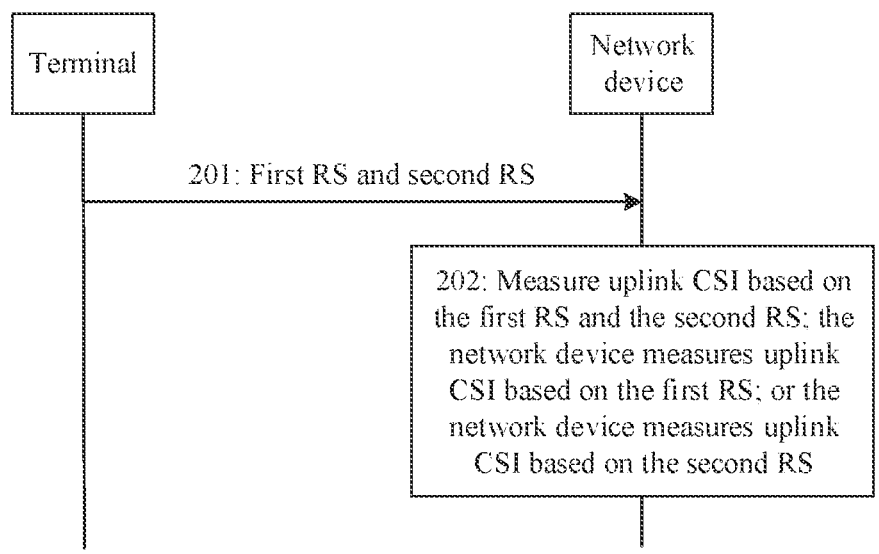
FIG. 2 is an interactive flowchart of a CSI measurement method according to an embodiment of this application.

As shown in FIG. 2, an embodiment of this application provides a CSI measurement method, including the following steps.

201. A network device receives a first reference signal (reference signal, RS for short) and a second RS from a terminal, where both the first RS and the second RS are used to measure uplink CSI, and one or more antenna ports, of the terminal, corresponding to one or more RS ports included in the second RS are at least partially the same as one or more antenna ports, of the terminal, corresponding to one or more RS ports included in the first RS.

Any RS that can be used to measure the uplink CSI can be used as the first RS or the second RS in this embodiment of this application. For example, both the first RS and the second RS may be SRSs. In this case, the first RS may be an SRS whose index is x (that is, an SRS whose resource ID is x), and the second RS may be an SRS whose index is y (that is, an SRS whose resource ID is y). Alternatively, the first RS may be an SRS, and the second RS may be a Doppler tracking RS (doppler tracking RS, DT-RS for short). In this case, the first RS may be an SRS whose index is x, and the second RS may be a DT-RS whose index is z (that is, a DT-RS whose resource ID is z). The DT-RS herein is merely an example. The DT-RS may also have another name, and may refer to another RS, other than the SRS, used to measure the uplink CSI.

Optionally, one or more types of resources, such as a time domain resource, a frequency domain resource, and a code domain resource, occupied by the one or more RS ports included in the first RS are different from that or those occupied by the one or more RS ports included in the second RS. The second RS in this embodiment of this application may be terminal specific (UE specific), may be cell specific (Cell specific), or may be cell-group specific (Cell-group specific).

The one or more antenna ports, of the terminal, corresponding to the one or more RS ports included in the second RS are at least partially the same as the one or more antenna ports, of the terminal, corresponding to the one or more RS ports included in the first RS, that is, the one or more antenna ports, of the terminal, corresponding to the one or more RS ports included in the second RS are partially the same as the one or more antenna ports, of the terminal, corresponding to the one or more RS ports included in the first RS (this is denoted as an example 1); or the one or more antenna ports, of the terminal, corresponding to the one or more RS ports included in the second RS are completely the same as the one or more antenna ports, of the terminal, corresponding to the one or more RS ports included in the first RS (this is denoted as an example 2).

The example 1 specifically means that at least one RS port included in the second RS respectively corresponds to at least one RS port included in the first RS. The example 2 specifically means that all the RS ports included in the second RS respectively correspond to all the RS ports included in the first RS. Two RS ports that have a correspondence correspond to a same antenna port of the terminal.

For example, a table 1 shows a scenario of the example 1. Two RS ports in a same column in the table 1 have a correspondence. RS ports included in the first RS are an RS port 1000, an RS port 1001, an RS port 1002, and an RS port 1003. RS ports included in the second RS are an RS port 1000, an RS port 1001, an RS port 1002, and an RS port 1003. Antenna ports, of the terminal, corresponding to the RS port 1002 and the RS port 1003 that are included in the first RS are respectively the same as antenna ports, of the terminal, corresponding to the RS port 1000 and the RS port 1001 that are included in the second RS.

TABLE 1

| Indexes of RS ports included in the first RS | 1000 | 1001 | 1002 | 1003 | — | — |
|---|---|---|---|---|---|---|
| Indexes of RS ports included in the second RS | — | — | 1000 | 1001 | 1002 | 1003 |

For example, a table 2 shows a scenario of the example 2. Two RS ports in a same column in the table 2 have a correspondence. RS ports included in the first RS are an RS port 1000, an RS port 1001, an RS port 1002, and an RS port 1003. RS ports included in the second RS are an RS port 1002, an RS port 1003, an RS port 1004, and an RS port 1005. Antenna ports, of the terminal, corresponding to the RS port 1000, the RS port 1001, the RS port 1002, and the RS port 1003 that are included in the first RS are respectively the same as antenna ports, of the terminal, corresponding to the RS port 1002, the RS port 1003, the RS port 1004, and the RS port 1005 that are included in the second RS.

TABLE 2

| Indexes of RS ports included in the first RS | 1000 | 1001 | 1002 | 1003 |
|---|---|---|---|---|
| Indexes of RS ports included in the second RS | 1002 | 1003 | 1004 | 1005 |

The indexes of the RS ports included in the first RS and the indexes of the RS ports included in the second RS may be completely the same, or may be partially the same, or may be completely different. This is not specifically limited in this embodiment of this application. In NR, indexes of RS ports included in each RS may be numbered starting from a minimum (or a maximum) index by default. For example, if a minimum index value is 1000, the indexes of the RS ports included in each RS may be numbered starting from 1000. The indexes of the RS ports included in each RS may also be flexibly allocated.

In the example in the table 1, the example 1 is described by using an example in which the indexes of the RS ports included in the first RS are completely the same as the indexes of the RS ports included in the second RS, but the antenna ports, of the terminal, corresponding to the RS ports included in the first RS are partially the same as the antenna ports, of the terminal, corresponding to the RS ports included in the second RS. In the example in the table 2, the example 2 is described by using an example in which the indexes of the RS ports included in the first RS are partially the same as the indexes of the RS ports included in the second RS, but the antenna ports, of the terminal, corresponding to the RS ports included in the first RS are completely the same as the antenna ports, of the terminal, corresponding to the RS ports included in the second RS.

202: The network device measures the uplink CSI based on the first RS and the second RS; the network device measures the uplink CSI based on the first RS; or the network device measures the uplink CSI based on the second RS.

During specific implementation of step 202, the network device may measure the uplink CSI based on the first RS or the second RS, so that the network device can select, based on a requirement, an RS for measuring the uplink CSI. A specific method for measuring the uplink CSI based on the first RS or the second RS is well known by a person skilled in the art, and details are not described herein again.

During specific implementation of step 202, the network device may alternatively perform joint measurement based on the first RS and the second RS to obtain downlink CSI that exists when the network device sends a PDSCH. In this case, during specific implementation, step 202 may include: The network device performs joint measurement based on the first RS carried on a first resource and the second RS carried on a second resource, to obtain the downlink CSI that exists when the network device sends the PDSCH. The first resource is a time-frequency resource occupied by an RS port included in the first RS, and the second resource is a time-frequency resource occupied by an RS port that is included in the second RS and that corresponds to the RS port included in the first RS.

In a first possible implementation, a joint measurement process may include: The network device obtains uplink CSI 1 of a first time unit through calculation based on the first RS carried on the first resource, and obtains downlink CSI 1 through calculation based on the uplink CSI 1; obtains uplink CSI 2 of a second time unit through calculation based on the second RS carried on the second resource, and obtains downlink CSI 2 through calculation based on the uplink CSI 2; and performs machine learning or linear/nonlinear prediction based on the downlink CSI 1 and the downlink CSI 2, to obtain the downlink CSI that exists when the network device sends the PDSCH.

In a second possible implementation, a joint measurement process may include: The network device obtains uplink CSI 1 of a first time unit through calculation based on the first RS carried on the first resource, and obtains downlink CSI 1 through calculation based on the uplink CST 1; obtains uplink CSI 2 of a second time unit through calculation based on the second RS carried on the second resource, and obtains downlink CST 2 through calculation based on the uplink CST 2; obtains, through calculation by using an interpolation algorithm, one or more pieces of uplink CST corresponding to one or more time units between the first time unit and the second time unit, and calculates corresponding downlink CSI based on the one or more pieces of uplink CSI; and performs machine learning or linear/nonlinear prediction based on all pieces of downlink CSI obtained through calculation, to obtain the downlink CSI that exists when the network device sends the PDSCH.

In a third possible implementation, a joint measurement process may include: The network device obtains uplink CSI 1 of a first time unit through calculation based on the first RS carried on the first resource, and obtains downlink CSI 1 through calculation based on the uplink CSI 1; obtains uplink CSI 2 of a second time unit through calculation based on the second RS carried on the second resource, and obtains downlink CSI 2 through calculation based on the uplink CSI 2; and averages the downlink CSI 1 and the downlink CSI 2 to obtain the downlink CSI that exists when the network device sends the PDSCH.

In the foregoing embodiment, the network device may obtain the downlink CSI through calculation based on the uplink CSI by using reciprocity between uplink and downlink channels.

The first time unit is a time unit for sending the first RS, and the second time unit is a time unit for sending the second RS. For descriptions of the time unit, refer to the following descriptions.

According to the method provided in this embodiment of this application, the network device may obtain, through the joint measurement that is based on the first RS and the second RS, the downlink CSI that exists when the PDSCH is sent, to obtain instantaneous CSI of the terminal in a terminal mobility scenario. Then, the network device determines a precoding matrix that better matches the current downlink CSI, and precodes, based on the precoding matrix, the PDSCH sent to the terminal, to avoid channel aging and improve receiving quality of receiving the PDSCH by the terminal.

In a current technology, antenna ports corresponding to RS ports included in SRSs are not limited, and the terminal may autonomously select an antenna port for sending an SRS, so that joint measurement cannot be implemented. According to the method provided in this embodiment of this application, the one or more antenna ports, of the terminal, corresponding to the one or more RS ports included in the second RS are at least partially the same as the one or more antenna ports, of the terminal, corresponding to the one or more RS ports included in the first RS, so that joint measurement can be performed based on the first RS and the second RS. In this way, the receiving quality of receiving the PDSCH by the terminal is improved.

Before step 201, the terminal may send the first RS and the second RS based on first indication information sent by the network device (this is denoted as an example 1), or may send the first RS and the second RS based on second indication information sent by the network device (this is denoted as an example 2). The following separately describes the two examples.

Example 1

Before step 201, the method may further include the following steps.

(11) The network device sends first indication information to the terminal, where the first indication information is used to indicate an RS port that is included in the second RS and that corresponds to an RS port included in the first RS.

(12) The terminal receives the first indication information from the network device, and sends, on a same antenna port based on the first indication information, the first RS carried on the first resource and the second RS carried on the second resource.

The first indication information may be implemented by using one message, or may be implemented by using a plurality of messages.

When the first indication information is implemented by using a plurality of messages, one message (denoted as a first message) may include information used to indicate the RS port included in the first RS, and another message (denoted as a second message) may include information used to indicate the RS port that is included in the second RS and that corresponds to the RS port included in the first RS. Optionally, there may also be one message including information used to indicate an index of the first RS and an index of the second RS. Certainly, the index of the first RS, the index of the second RS, or the index of the first RS and the index of the second RS may alternatively be included in the first message or the second message.

The first indication information may explicitly (explicit) or implicitly (implicit) indicate the RS port that is included in the second RS and that corresponds to the RS port included in the first RS. The following provides descriptions in a manner 1 to a manner 4. In the manner 1 to the manner 4, the RS port that is included in the second RS and that corresponds to the RS port included in the first RS is explicitly indicated in the manner 1, and the RS port that is included in the second RS and that corresponds to the RS port included in the first RS is implicitly indicated in the manner 2 to the manner 4. In the manner 1 to the manner 4, an example in which the first indication information is implemented by using one message is used to describe the first indication information.

Manner 1. The first indication information indicates a part/all of RS ports included in the second RS, a part/all of RS ports included in the first RS, and a correspondence between an RS port included in the second RS and an RS port included in the first RS.

During specific implementation of the manner 1, based on the example shown in the table 1, the first indication information may indicate the RS port 1002 included in the first RS, the RS port 1000 included in the second RS, and a correspondence between the RS port 1002 included in the first RS and the RS port 1000 included in the second RS. The first indication information may further indicate the RS port 1003 included in the first RS, the RS port 1001 included in the second RS, and a correspondence between the RS port 1003 included in the first RS and the RS port 1001 included in the second RS.

During specific implementation of the manner 1, based on the example shown in the table 2, the first indication information may indicate the RS port 1000 included in the first RS, the RS port 1002 included in the second RS, and a correspondence between the RS port 1000 included in the first RS and the RS port 1002 included in the second RS. The first indication information may further indicate the RS port 1001 included in the first RS, the RS port 1003 included in the second RS, and a correspondence between the RS port 1001 included in the first RS and the RS port 1003 included in the second RS. The first indication information may further indicate the RS port 1002 included in the first RS, the RS port 1004 included in the second RS, and a correspondence between the RS port 1002 included in the first RS and the RS port 1004 included in the second RS. The first indication information may further indicate the RS port 1003 included in the first RS, the RS port 1005 included in the second RS, and a correspondence between the RS port 1003 included in the first RS and the RS port 1005 included in the second RS.

Optionally, the first indication information may also indicate the index of the first RS, the first indication information may also indicate the index of the second RS, or the first indication information may also indicate the index of the first RS and the index of the second RS.

Manner 2: The first indication information indicates the RS port included in the second RS and the RS port included in the first RS.

There is a preset correspondence between RS ports that are of the two RSs and that are indicated by the first indication information. For example, RS ports, included in the first RS, whose indexes are in ascending order respectively correspond to RS ports, included in the second RS, whose indexes are in ascending order (or in descending order).

During specific implementation of the manner 2, based on the example shown in the table 1, the first indication information may indicate the RS port 1002 included in the first RS, the RS port 1003 included in the first RS, the RS port 1000 included in the second RS, and the RS port 1001 included in the second RS. When the RS ports, included in the first RS, whose indexes are in ascending order respectively correspond to the RS ports, included in the second RS, whose indexes are in ascending order, it indicates that the RS port 1002 included in the first RS corresponds to the RS port 1000 included in the second RS, and the RS port 1003 included in the first RS corresponds to the RS port 1001 included in the second RS.

Optionally, the first indication information may also indicate the index of the first RS, the first indication information may also indicate the index of the second RS, or the first indication information may also indicate the index of the first RS and the index of the second RS.

Manner 3: The first indication information indicates identifiers of antenna ports, of the terminal, corresponding to the RS ports included in the first RS and the second RS.

The identifier may be an antenna port number of the terminal. For example, when the terminal has eight antenna ports, antenna port numbers of the terminal are 0 to 7, that is, the terminal includes eight antenna ports whose indexes are 0 to 7.

During specific implementation of the manner 3, based on the example shown in the table 1, for indexes that are indicated by the first indication information and that are of the antenna ports, of the terminal, corresponding to the RS ports included in the first RS and the second RS, refer to a table 3. In this case, the terminal may determine, based on the first indication information, that the RS port 1002 included in the first RS corresponds to the RS port 1000 included in the second RS, and the RS port 1003 included in the first RS corresponds to the RS port 1001 included in the second RS.

TABLE 3

| RS | First RS | | | | Second RS | | | |
|---|---|---|---|---|---|---|---|---|
| Indexes of RS ports | 1000 | 1001 | 1002 | 1003 | 1000 | 1001 | 1002 | 1003 |
| Indexes of antenna ports of the terminal | 1 | 2 | 3 | 4 | 3 | 4 | 5 | 6 |

Optionally, the first indication information may also indicate the index of the first RS, the first indication information may also indicate the index of the second RS, or the first indication information may also indicate the index of the first RS and the index of the second RS.

In the manner 1 to the manner 3, the index that is of the first RS and that is indicated by the first indication information, the index that is of the second RS and that is indicated by the first indication information, or the index that is of the first RS and that is indicated by the first indication information and the index that is of the second RS and that is indicated by the first indication information is or are used by the terminal to determine an RS to which an RS port indicated by the first indication information belongs. When the terminal learns which RS ports indicated by the first indication information belong to the first RS, the first indication information may indicate only the index of the second RS. When the terminal learns which RS ports indicated by the first indication information belong to the second RS, the first indication information may indicate only the index of the first RS. When the terminal does not learn which RS ports indicated by the first indication information belong to the first RS, and does not learn which RS ports indicated by the first indication information belong to the second RS, the first indication information may indicate the indexes of the first RS and the second RS.

Manner 4: the first indication information indicates the index of the first RS, the first indication information indicates the index of the second RS, or the first indication information indicates the index of the first RS and the index of the second RS.

When the terminal learns of the first RS, the first indication information may indicate only the index of the second RS. When the terminal learns of the second RS, the first indication information may indicate only the index of the first RS. When the terminal does not learn of the first RS, and does not learn of the second RS, the first indication information may indicate the indexes of the first RS and the second RS.

During specific implementation of the manner 4, there is a preset correspondence between RS ports that are of two RSs and that are indicated by the first indication information. For example, RS ports, included in the first RS, whose indexes are in ascending order respectively correspond to RS ports, included in the second RS, whose indexes are in ascending order (or in descending order), and two RS ports that have a correspondence use a same antenna port of the terminal.

During specific implementation of step (11), the network device may send the first indication information to the terminal by using at least one of radio resource control (radio resource control, RRC for short) signaling, media access control control element (media access control control element, MAC CE for short) signaling, or downlink control information (downlink control information, DCI for short). It may be understood that which type of signaling is used by the network device to send the first indication information to the terminal indicates which type of signaling used by the terminal to receive the first indication information from the network device.

During specific implementation of step (11), for example, the network device may directly send the first indication information by using the RRC signaling, or may send the first indication information by using the RRC signaling+the DCI, or may send the first indication information by using the RRC signaling+the MAC-CE signaling+the DCI.

During specific implementation of step (11), the implementation in the manner 4 is used as an example. It is assumed that the first RS is an SRS whose index is 3, and the second RS is a DT-RS whose index is 3. In a possible implementation, the network device may directly send the indexes of the first RS and the second RS to the terminal by using the RRC signaling. In another possible implementation, the network device may indicate an SRS set (set) and a DT-RS set of the terminal by using the RRC signaling, and then indicate, by using the DCI, the SRS whose index is 3 in the SRS set and the DT-RS whose index is 3 in the DT-RS set. The SRS set includes a plurality of SRSs, and the DT-RS set includes a plurality of DT-RSs.

During specific implementation of step (12), based on the example shown in the table 1, the terminal sends, on one antenna port, the first RS carried on a resource occupied by the RS port 1002 included in the first RS and the second RS carried on a resource occupied by the RS port 1000 included in the second RS; and sends, on another antenna port, the first RS carried on a resource occupied by the RS port 1003 included in the first RS and the second RS carried on a resource occupied by the RS port 1001 included in the second RS.

It may be understood that, if the terminal sends the first RS on a resource occupied by an RS port, the network device receives the first RS on the resource occupied by the RS port. This rule also applies to the second RS.

Example 2

Before step 201, the method may further include the following steps.
  (21) The network device sends second indication information to the terminal, where the second indication information is used to indicate whether a correspondence between an RS port included in the first RS and an RS port included in the second RS is enabled. Alternatively, the second indication information is used to indicate whether a correspondence is configured between an RS port included in a first RS and an RS port included in a second RS.
  (22) The terminal receives the second indication information from the network device, where when the second indication information indicates that the correspondence between the RS port included in the first RS and the RS port included in the second RS is configured or that the correspondence is enabled, the terminal sends, on a same antenna port based on the second indication information, the first RS carried on a first resource and the second RS carried on a second resource.

In the example 2, there is a preset correspondence respectively between at least a part of RS ports included in the first RS and at least a part of RS ports included in the second RS, and whether the correspondence is configured or enabled is indicated by the second indication information. When the second indication information indicates that the correspondence between the RS port included in the first RS and the RS port included in the second RS is configured or the correspondence is enabled, the terminal may determine, based on the second indication information, that a port of the first RS corresponds to a port of the second RS, and that which RS ports of the first RS correspond to which RS ports of the second RS. The first RS and the second RS may be located in a same RS set or a same RS resource configuration (RS resource setting).

A preset correspondence between RS ports may be preset based on RS ports included in two RSs. For example, based on the example shown in the table 1, there is a preset correspondence between the RS port 1002 included in the first RS and the RS port 1000 included in the second RS, and there is a preset correspondence between the RS port 1003 included in the first RS and the RS port 1001 included in the second RS. Whether the correspondences are enabled depends on an indication of the second indication information.

During specific implementation, the second indication information may perform the indication by using one piece of information in a field. For example, the field may be a usage field. For example, the usage field may be set in resource configuration information. When the resource configuration information sent by the network device to the terminal carries the usage field, it indicates that the correspondence between the RS port included in the first RS and the RS port included in the second RS is configured, or it indicates that the correspondence between the RS port included in the first RS and the RS port included in the second RS may be enabled by the terminal.

Before step 201, the network device may configure a third resource and a fourth resource for the terminal. The third resource is a resource used to measure uplink CSI of the RS port included in the first RS, and the fourth resource is a resource used to measure uplink CSI of the RS port included in the second RS. The network device may configure the second RS for the terminal when the terminal has a requirement. For example, the network device may configure the second RS for the terminal when detecting that a moving speed of the terminal is greater than a threshold, so that the network device measures the uplink CSI based on the first RS and the second RS. Specifically, the network device may configure the third resource and the fourth resource in the following manner 1 or manner 2.

Manner 1: The network device separately configures the third resource and the fourth resource for the terminal.

In this case, the method may further include: The network device sends first configuration information to the terminal, where the first configuration information is used to configure the third resource, and the terminal receives the first configuration information from the network device, and determines the third resource based on the first configuration information. The network device sends second configuration information to the terminal, where the second configuration information is used to configure the fourth resource; and the terminal receives the second configuration information from the network device, and determines the fourth resource based on the second configuration information.

The second configuration information and the first indication information (or the second indication information) may be included in a same message for sending, or may be included in different messages for sending.

Manner 2: The network device uniformly configures the third resource and the fourth resource for the terminal.

In this case, the method may further include: The network device sends third configuration information to the terminal, where the first configuration information is used to configure the third resource and the fourth resource. The terminal receives the third configuration information from the network device, and determines the third resource and the fourth resource based on the third configuration information.

It should be noted that, during actual resource configuration, to reduce signaling overheads, the network device may configure a plurality of RSs for the terminal. For example, if both the first RS and the second RS are SRSs, the network device may configure, for the terminal, an SRS set (including the first RS and the second RS) and a resource used to measure uplink CSI of an RS port included in an SRS in the SRS set. When the first RS is an SRS and the second RS is a DT-RS, the network device may configure, for the terminal, an SRS set (including the first RS), a DT-RS set (including the second RS), and resources used to measure uplink CSI of an RS port included in an SRS in the SRS set and measure uplink CSI of an RS port included in a DT-RS in the DT-RS set. After the resource configuration is completed, the network device may enable, when determining that the terminal needs to send the first RS and the second RS, the terminal to send the first RS and the second RS.

For example, when the first RS is an SRS and the second RS is a DT-RS, the network device may configure, for the terminal, an SRS set, a DT-RS set, and resources used to measure uplink CSI of an RS port included in an SRS in the SRS set and measure uplink CSI of an RS port included in a DT-RS in the DT-RS set. The SRS set includes SRSs whose indexes are 0 to 9, and the DT-RS set includes DT-RSs whose indexes are 0 to 5. The network device may enable, when determining that the terminal needs to send an SRS, the terminal to send the SRS (that is, the first RS) whose index is 3 and the DT-RS (that is, the second RS) whose index is 3.

To make the method provided in this embodiment of this application clearer, the following specifically describes the resource occupied by the RS port included in the second RS and a frequency domain transmission manner (for example, whether frequency hopping is performed) of the second RS.

In the following description, the time unit may be an OFDM symbol, a slot, a subframe (subframe), a transmission time interval (transmission time interval, TTI for short), or the like. A frequency-domain granularity may be n (n is an integer greater than 0) subcarriers. In this case, a frequency band obtained through division based on the frequency-domain granularity includes n subcarriers. For example, n may be 1, 12, 60, or the like. For ease of description, in this embodiment of this application, the frequency band obtained through division based on the frequency-domain granularity is referred to as a frequency domain unit.

In a possible implementation (denoted as an implementation 1), in a same time unit, one or more frequency domain resources occupied by one or more RS ports included in the second RS are periodic.

The implementation 1 may also be expressed as follows. In a same time unit, one or more frequency domain resources occupied by one or more RS ports included in the second RS are periodically distributed on different frequency bands obtained through division based on the frequency-domain granularity; or in a same time unit, one or more frequency domain resources occupied by one or more RS ports included in the second RS are evenly distributed on bandwidth of the terminal. In other words, locations and sizes (that is, a quantity of occupied subcarriers) of resources that are located in each frequency domain unit and that are in resources occupied by the RS ports included in the second RS are the same.

Figure 3:
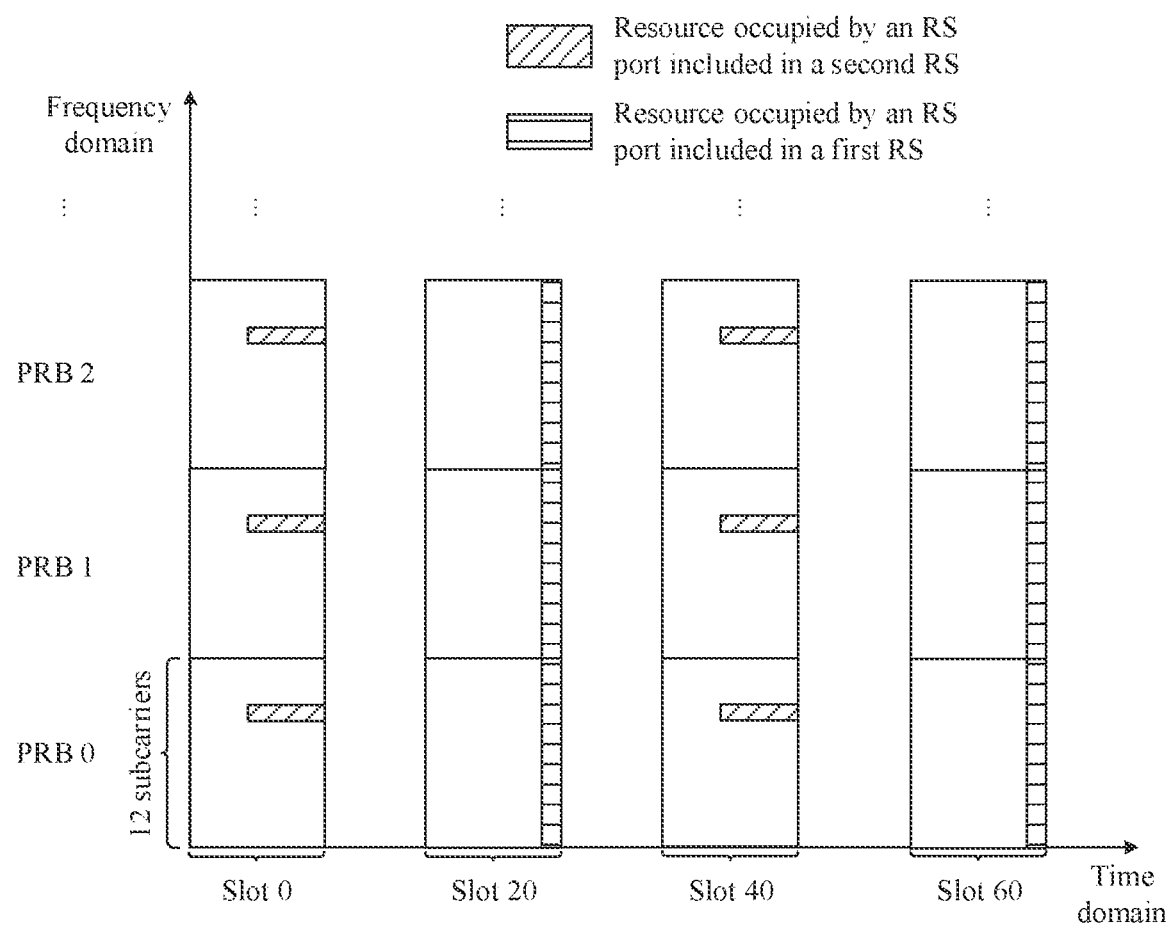
FIG. 3 and FIG. 4 each are a schematic diagram of time-frequency resources occupied by a first RS and a second RS according to an embodiment of this application.

In a case (denoted as an example (1)), a periodicity of one or more frequency domain resources occupied by one or more RS ports included in the second RS may be 12 subcarriers. In this case, in a same slot, the one or more frequency domain resources occupied by one or more RS ports included in the second RS are evenly distributed on each physical resource block (physical resource block, PRB for short). For example, as shown in FIG. 3, in a slot 0 and a slot 40, each PRB includes the one or more frequency domain resources occupied by the one or more RS ports included in the second RS.

In another case (denoted as an example (2)), a periodicity of one or more frequency domain resources occupied by one or more RS ports included in the second RS may be 60 subcarriers. In this case, in a same slot, one or more of every five PRBs include the one or more frequency domain resources occupied by the one or more RS ports included in the second RS. For example, as shown in FIG. 4, in a slot 0 and a slot 40, a PRB 5j includes the one or more frequency domain resources occupied by the one or more RS ports included in the second RS, where j is an integer greater than or equal to 0.

Figure 4:
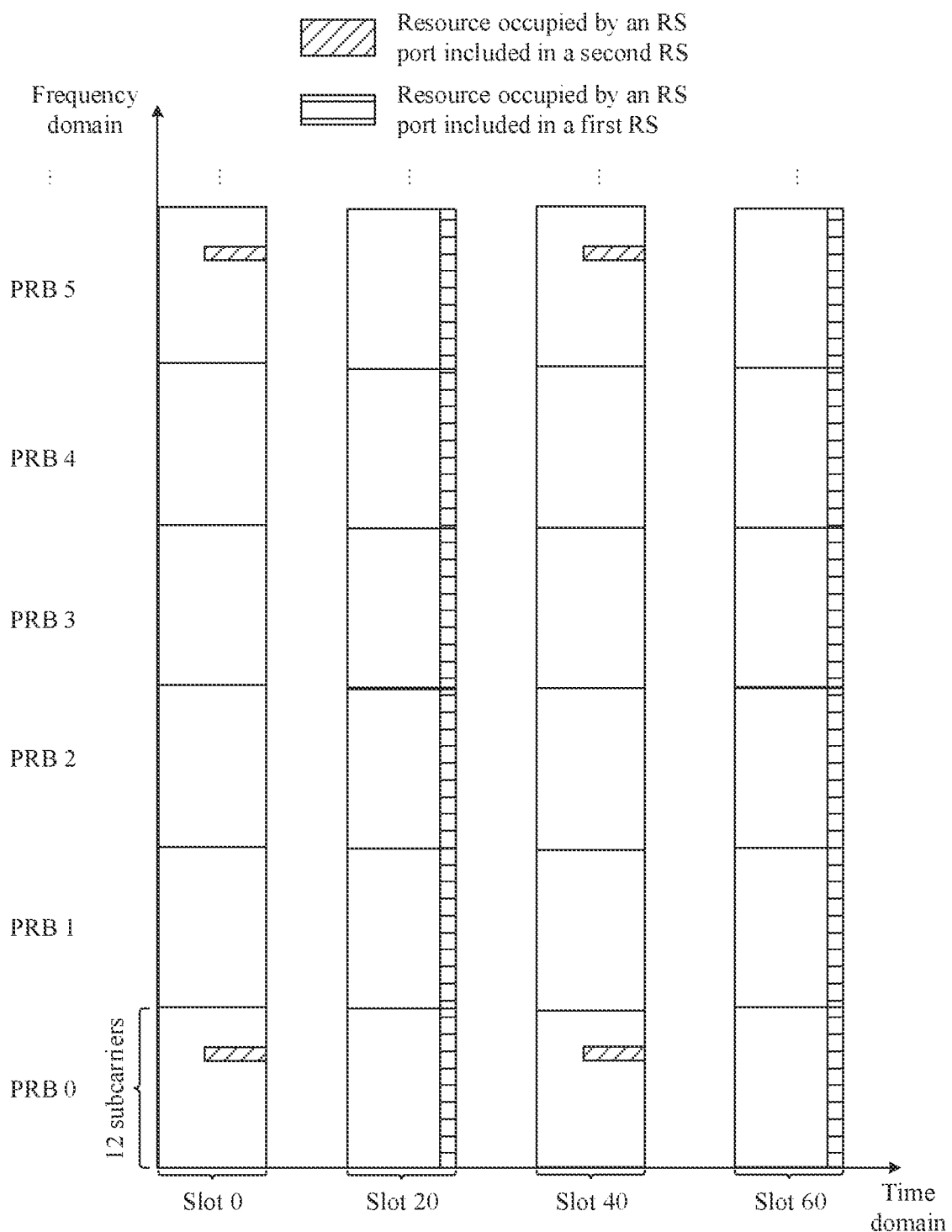

Based on the example shown in FIG. 4, if time-frequency resources occupied by RS ports included in both the first RS and the second RS are four resource elements (resource element, RE for short), for overheads of the first RS and the second RS, refer to a table 4. It can be learned from the table 4 that the overheads of the second RS are only ⅕ of the overheads of the first RS. Therefore, compared with the first RS, the terminal may send the second RS more intensively in terms of time, and system overheads are not excessively increased, so as to ensure that instantaneous CSI in a terminal mobility scenario is obtained with low overheads.

TABLE 4

| RS | Quantity of REs occupied by one or more RS ports included in an RS in five consecutive PRBs in frequency domain |
| --- | --- |
| First RS | 4 REs * 5 = 20 REs |
| Second RS | 4 RES |

In the foregoing embodiment, the example (1) and the example (2) are used as examples to describe the periodicity of the one or more frequency domain resources occupied by the one or more RS ports included in the second RS. During actual implementation, the periodicity of the one or more frequency domain resources occupied by the one or more RS ports included in the second RS may alternatively be another quantity of subcarriers. The second RS in this embodiment of this application may not occupy consecutive PRBs, and resource overheads can be reduced in comparison with an existing SRS.

To further reduce resource overheads, in a possible implementation (denoted as an implementation 2), a quantity of REs occupied by the one or more RS ports included in the second RS is less than or equal to a quantity of REs occupied by the one or more RS ports included in the first RS.

The implementation 2 may also be expressed as follows: RE density of each RS port included in the second RS is less than or equal to RE density of each RS port included in the first RS.

Both the quantity of REs occupied by the one or more RS ports included in the second RS and the quantity of REs occupied by the one or more RS ports included in the first RS are quantities of REs obtained through calculation in a time period T. The time period T is a common multiple of a periodicity of one or more time domain resources occupied by one or more RS ports included in the second RS and a periodicity of one or more time domain resources occupied by one or more RS ports included in the first RS. For example, if the periodicity of the one or more time domain resources occupied by the one or more RS ports included in the second RS is 20 slots, and the periodicity of the one or more time domain resources occupied by the one or more RS ports included in the first RS is 40 slots, T is 40 slots.

In a possible implementation (denoted as an implementation 3), in a same time unit, a frequency band obtained through division based on the frequency-domain granularity includes only one or more time-frequency resources occupied by a part of the RS ports included in the second RS. In the implementation 3, communication interference can be evenly distributed on different time-frequency resources, thereby improving system performance.

Figure 5:
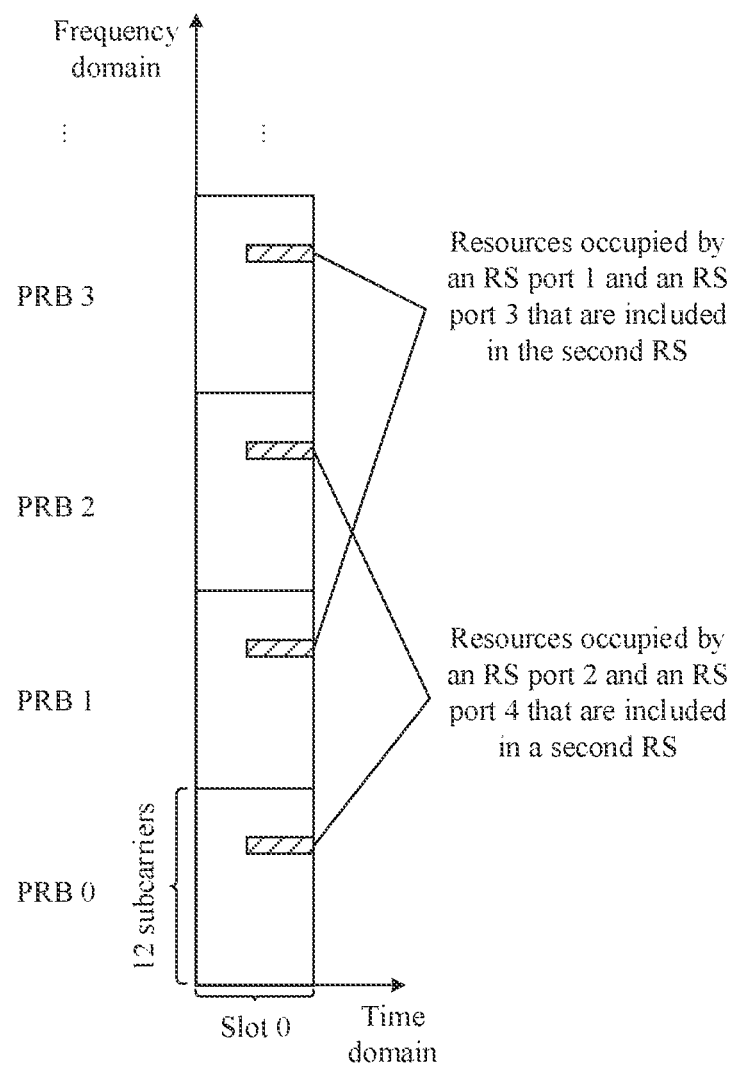
FIG. 5 is a schematic diagram of time-frequency resources occupied by a second RS according to an embodiment of this application.

When the time unit is a slot, and a frequency domain unit includes 12 subcarriers, in the implementation 3, the one or more RS ports included in the second RS are distributed on different PRBs. For example, as shown in FIG. 5, the second RS includes an RS port 1 to an RS port 4. In the slot 0, time-frequency resources occupied by the RS port 2 and the RS port 4 are distributed on a PRB 2j, and time-frequency resources occupied by the RS port 1 and the RS port 3 are distributed on a PRB (2j+1).

When the implementation 1 and the implementation 3 are combined, based on the example shown in FIG. 5, it may be understood that the periodicity of the one or more frequency domain resources occupied by the one or more RS ports included in the second RS is 24 subcarriers.

In a possible implementation (denoted as an implementation 4), the second RS performs frequency hopping in different time units at a frequency-domain granularity. In the implementation 4, communication interference can be evenly distributed on different time-frequency resources, thereby improving system performance.

The implementation 4 may also be described as follows: The second RS carried on a time-frequency resource including a time unit 1 and a frequency band 1 obtained through division based on the frequency-domain granularity is carried on a frequency band 2 obtained through division based on the frequency-domain granularity in a time unit 2.

Figure 6:
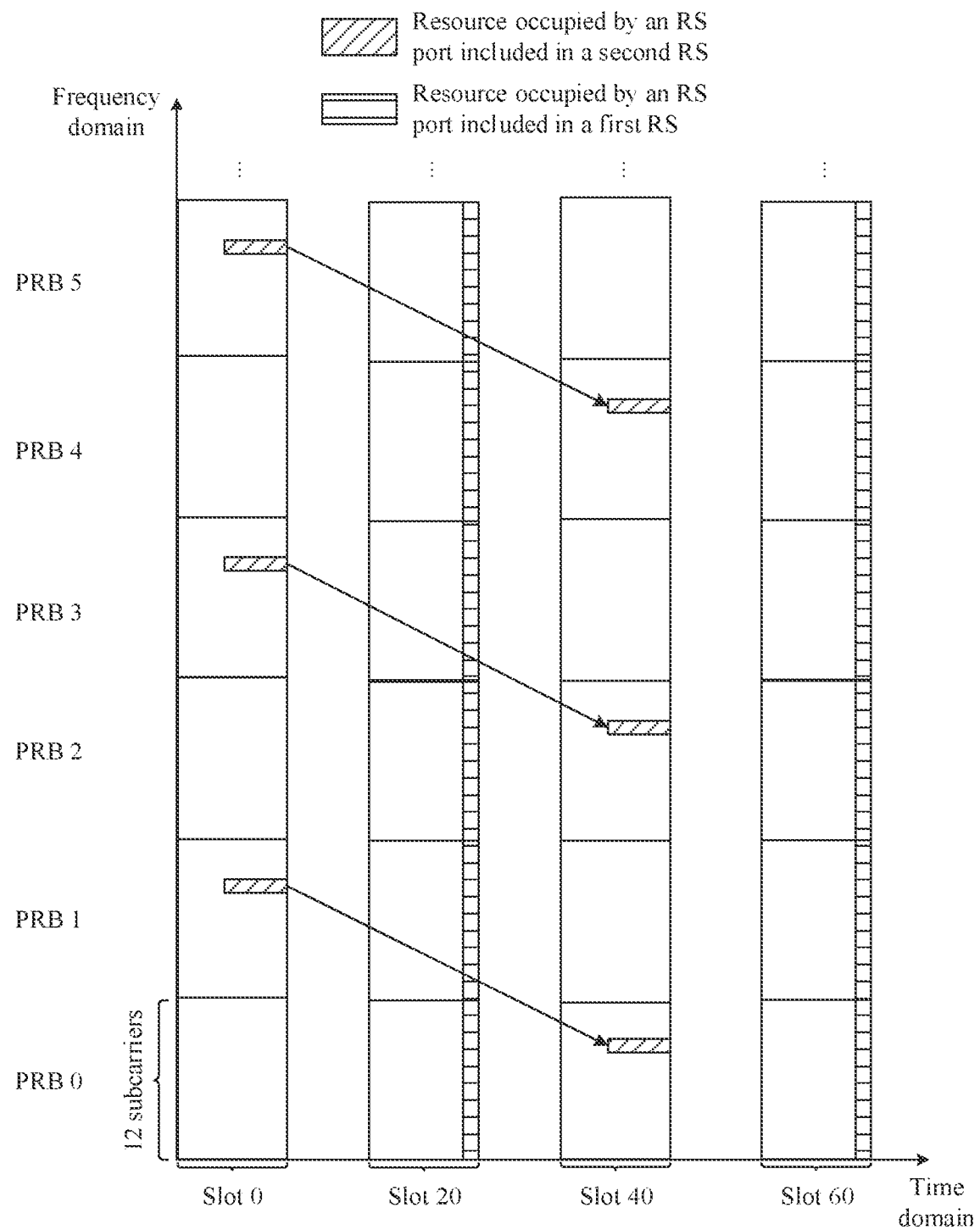
FIG. 6 is a schematic diagram of time-frequency resources occupied by a first RS and a second RS according to an embodiment of this application.

It may be understood that, when the time unit is a slot, and the frequency domain unit includes 12 subcarriers, the second RS performs frequency hopping by using one or more PRBs in different slots. For example, as shown in FIG. 6, the second RS performs frequency hopping by using one PRB in different slots. The second RS carried on the PRB (2j+1) in the slot 0 performs frequency hopping to the PRB (2j) in the slot 40.

Figure 7:
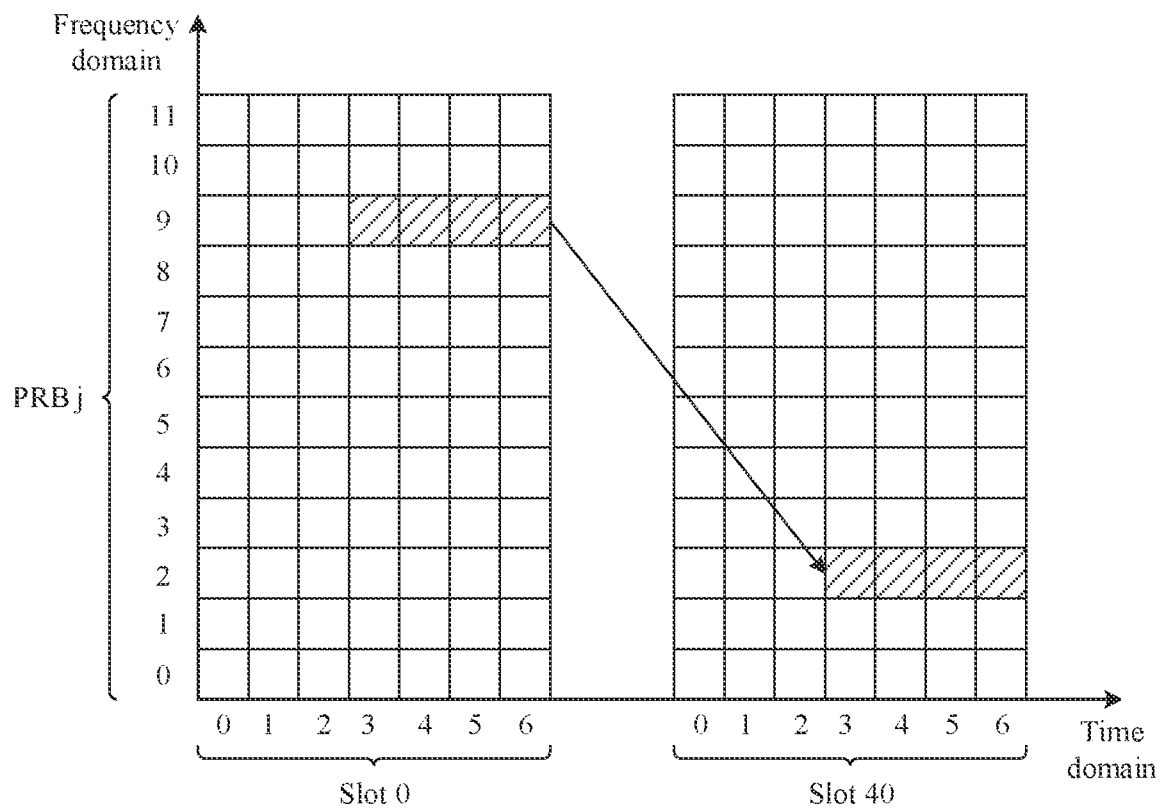
FIG. 7 is a schematic diagram of time-frequency resources occupied by a second RS according to an embodiment of this application.

When the time unit is a slot, and the frequency domain unit includes one subcarrier, the second RS performs frequency hopping by using one or more subcarriers in different slots. For example, referring to FIG. 7, the second RS performs frequency hopping by using seven subcarriers in different slots. In the slot 0, the second RS carried on a time-frequency resource including an OFDM 3 to an OFDM 6 and a subcarrier 9 performs frequency hopping to a time-frequency resource including the OFDM 3 to the OFDM 6 and a subcarrier 2 in the slot 40.

In a possible implementation (denoted as an implementation 5), one or more time domain resources occupied by one or more RS ports included in the second RS are consecutive in at least two time units.

Figure 8:
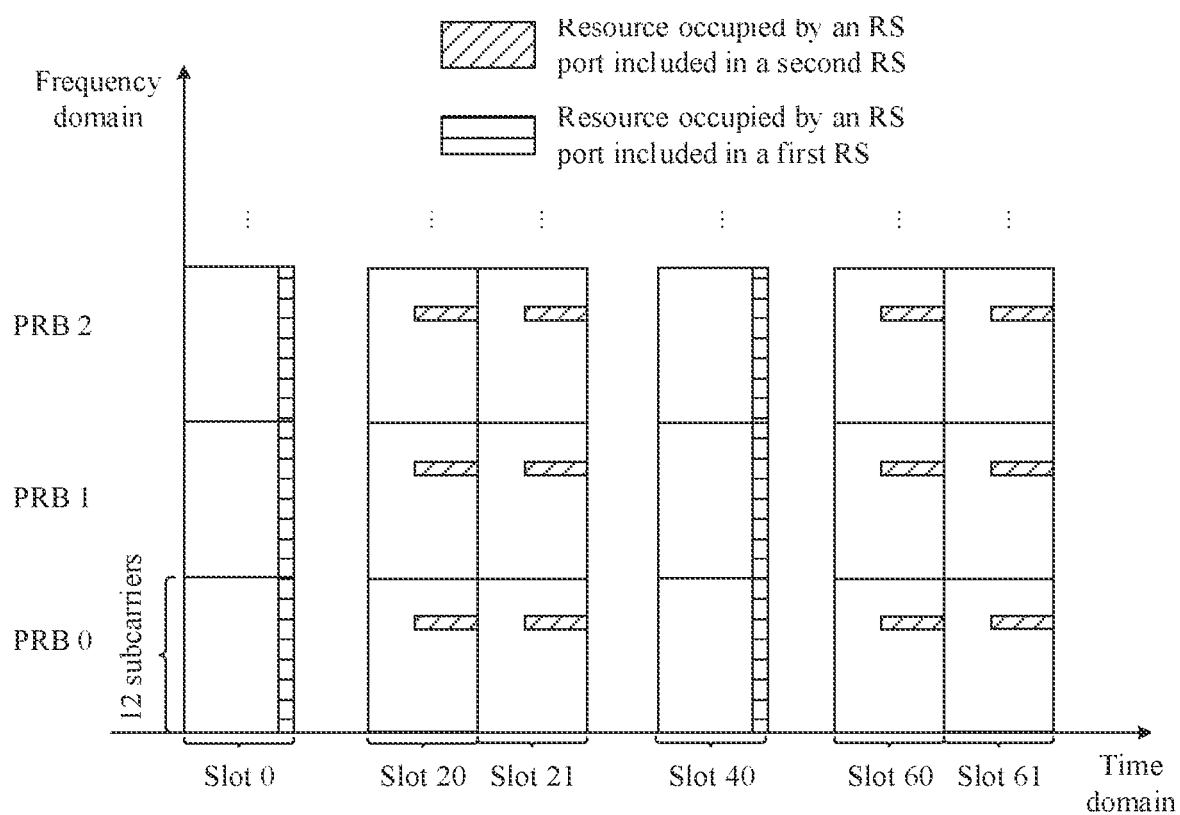
FIG. 8 to FIG. 10 each are a schematic diagram of time-frequency resources occupied by a first RS and a second RS according to an embodiment of this application.

For example, it is assumed that the time unit is a slot, and the frequency domain unit includes 12 subcarriers. As shown in FIG. 8, the one or more time domain resources occupied by the one or more RS ports included in the second RS are consecutive in a slot 20 and a slot 21, and are consecutive in a slot 60 and a slot 61. The second RS does not perform frequency hopping in different slots. It should be noted that in this embodiment of this application, the implementation 5 is described by using an example in which the one or more time domain resources occupied by the one or more RS ports included in the second RS are consecutive in two slots. During actual implementation, the one or more time domain resources occupied by the one or more RS ports included in the second RS may be consecutive in more time units.

Figure 9:
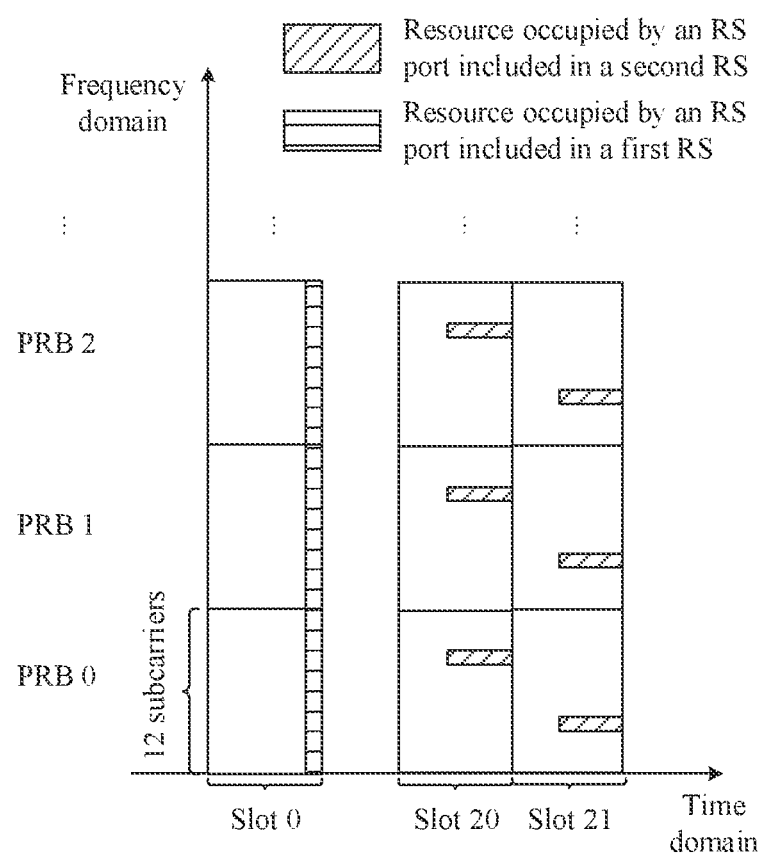

When the implementation 4 and the implementation 5 are combined, as shown in FIG. 9, the one or more time domain resources occupied by the one or more RS ports included in the second RS are consecutive in the slot 20 and the slot 21, and the second RS performs frequency hopping by using PRBs in different time units.

In addition, the one or more time domain resources occupied by the one or more RS ports included in the second RS may be periodic (periodic), aperiodic (aperiodic), or semi-persistent (semi-persistent). How the terminal specifically sends the second RS depends on a configuration of the network device.

When the one or more time domain resources occupied by the one or more RS ports included in the second RS are periodic, that the network device enables the terminal to send the second RS may be described as follows: The network device configures to start the second RS. In this case, after the second RS is configured and started, the terminal keeps sending the second RS.

When the one or more time domain resources occupied by the one or more RS ports included in the second RS are aperiodic, that the network device enables the terminal to send the second RS may be described as follows: The network device activates the second RS. In this case, after the second RS is activated, the terminal sends the second RS once.

When the one or more time domain resources occupied by the one or more RS ports included in the second RS are semi-persistent, that the network device enables the terminal to send the second RS may be described as follows: The network device activates the second RS. When the network device does not need the terminal to send the second RS, for example, when the network device detects that the moving speed of the terminal is less than or equal to the threshold, the network device enables the terminal not to send the second RS anymore, and that the network device enables the terminal not to send the second RS anymore may be described as follows: The network device deactivates the second RS. In this case, after the second RS is activated, the terminal continuously sends the second RS until the second RS is deactivated.

For example, in FIG. 3 and FIG. 4, the one or more time domain resources occupied by the one or more RS ports included in the second RS are periodic, and a periodicity is 40 slots.

Figure 10:
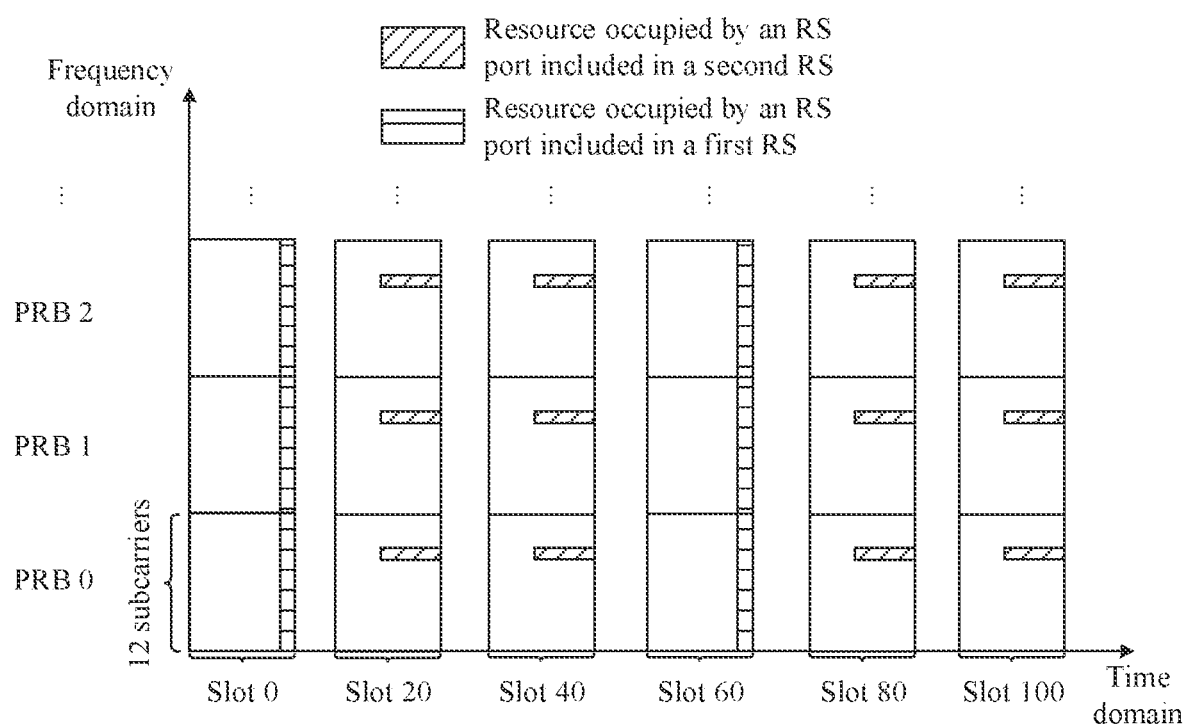

In addition, a time domain resource used to carry an RS (regardless of the first RS or the second RS) for measuring the uplink CSI may be periodic. In this case, the one or more time domain resources occupied by the one or more RS ports included in the second RS may be periodic, or may not be periodic. For example, referring to FIG. 10, the terminal sends the first RS in the slot 0, sends the second RS in the slot 20, sends the second RS in the slot 40, sends the first RS in the slot 60, sends the second RS in a slot 80, sends the second RS in a slot 100, and so on. In FIG. 10, the one or more time domain resources occupied by the one or more RS ports included in the second RS are not periodic.

In a possible implementation (denoted as an implementation 6), the first RS and the second RS use different comb structures in frequency domain.

In the foregoing embodiment, the method provided in this embodiment of this application is described by using an example in which a comb structure used by the first RS in frequency domain is a comb 1. The comb structure used by the first RS in frequency domain may alternatively be another structure, for example, a comb 3 or a comb 6.

The first RS and the second RS may use different comb structures in frequency domain. For example, if a comb structure used by the first RS in frequency domain is a comb 2, a comb structure used by the second RS in frequency domain is not the comb 2, and may be the comb 3 or a comb 4. If a comb structure used by the first RS in the frequency domain is a comb 60, a comb structure used by the second RS in the frequency domain is not the comb 60, and may be a comb 90 or a comb 120.

Figure 10A:
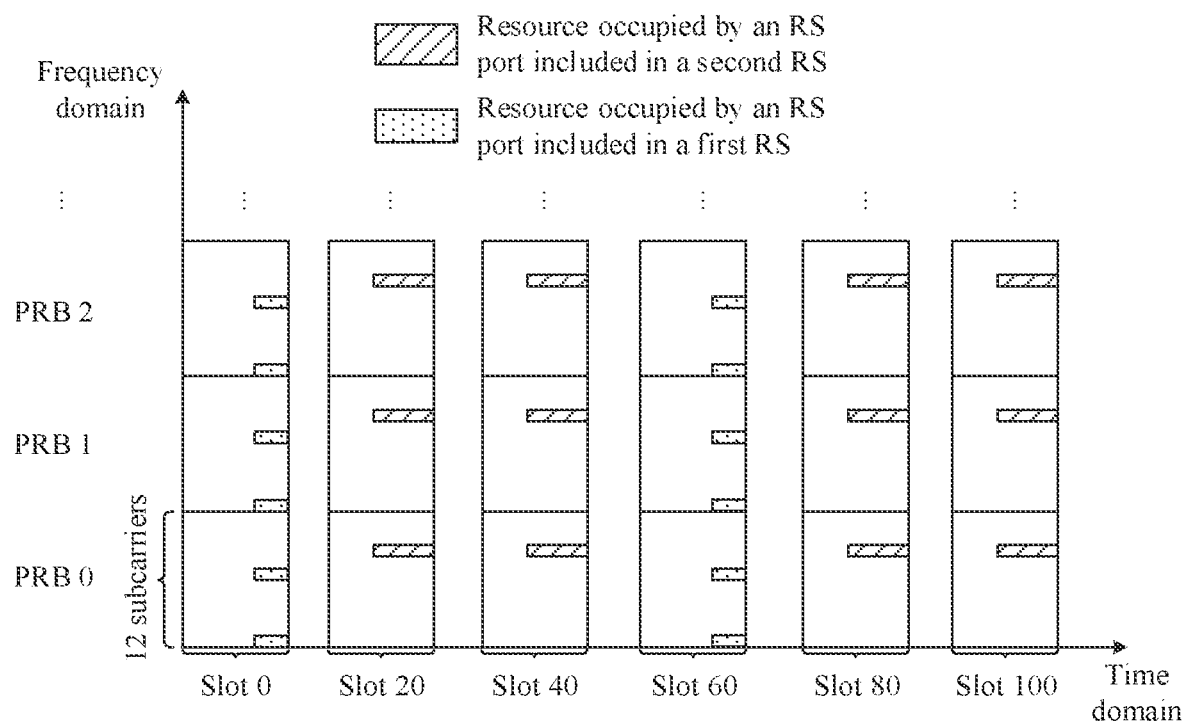
FIG. 10A is a schematic diagram of time-frequency resources occupied by a first RS and a second RS according to an embodiment of this application.

For example, referring to FIG. 10A, a comb structure used by the first RS in frequency domain is a comb 6, and a comb structure used by the second RS in frequency domain is a comb 12. It should be noted that distribution of the first RS and the second RS shown in FIG. 10A is merely an example. In this example, one or more time domain resources occupied by one or more RS ports included in the second RS are not periodic. Certainly, the one or more time domain resources occupied by the one or more RS ports included in the second RS may alternatively be periodic. In each periodicity, the one or more RS ports included in the second RS may be carried in one time unit, or may be carried in a plurality of time units (where the plurality of time units may be consecutive or inconsecutive). This is not limited in this application. In addition, in the foregoing embodiment of this application, a comb size (namely, K) of a comb structure used by the first RS in FIG. 3, FIG. 4, FIG. 6, FIG. 8, and FIG. 9 in frequency domain may alternatively be greater than 1. For example, a comb structure used by the first RS in FIG. 3, FIG. 4, FIG. 6, FIG. 8, and FIG. 9 in frequency domain may alternatively be the comb 6.

In the implementation 6, optionally, distribution of the second RS in frequency domain is sparser than distribution of the first RS in frequency domain. In other words, a comb size of a comb structure used by the second RS is greater than a comb size of a comb structure used by the first RS. Compared with a case in which the first RS and the second RS use a same comb structure in frequency domain, pilot overheads can be reduced by using the optional method. Certainly, during actual implementation, the first RS and the second RS may alternatively use a same comb structure in frequency domain. This is not limited in this application.

In the foregoing embodiment, a quantity of OFDM symbols occupied by the first RS in the time unit carrying the first RS may be the same as or different from a quantity of OFDM symbols occupied by the second RS in the time unit carrying the second RS. This is not limited in this application. In the foregoing embodiment, the method provided in this embodiment of this application is described by using an example in which the first RS and the second RS occupy different quantities of OFDM symbols.

In the foregoing embodiment, the method provided in the foregoing embodiment is described by using an example in which the terminal sends the first RS and the second RS. During actual implementation, the network device may further activate/configure to start more SRSs, more DT-RSs, or more SRSs and DT-RSs, that is, the terminal may send more SRSs, more DT-RSs, or more SRSs and DT-RSs. The network device measures the uplink CSI based on the more SRSs, the more DT-RSs, or the more SRSs and DT-RSs.

A solution different from the solution provided in the foregoing embodiment may be obtained by replacing the "first RS" with a "first part RS" and by replacing the "second RS" with a "second part RS" in the foregoing embodiment. The first part RS and the second part RS are two parts of a same SRS, and the first part RS and the second part RS are carried on different resources in resources occupied by the one or more RS ports included in the SRS. For example, the first part RS is carried on resources occupied by a part of the RS ports included in the SRS, and the second part RS is carried on resources occupied by the other part of the RS ports included in the SRS.

The foregoing mainly describes the solutions in the embodiments of this application from a perspective of interaction between network elements. It may be understood that, to implement the foregoing functions, each network element, such as a network device or a terminal, includes a corresponding hardware structure or a software module for performing each function, or a hardware structure and a software module. A person skilled in the art should easily be aware that, in combination with units and algorithm steps of the examples described in the embodiments disclosed in this specification, this application may be implemented by hardware or a combination of hardware and computer software. Whether a function is executed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function unit division may be performed on the network device or the terminal based on the foregoing method example. For example, each function unit may be obtained through division based on a corresponding function, or two or more functions may be integrated into one processing unit. The integrated unit may be implemented in a form of hardware, or may be implemented in a form of a software function unit. It should be noted that, in the embodiments of this application, unit division is an example, and is merely logical function division. In actual implementation, another division manner may be used.

Figure 11:
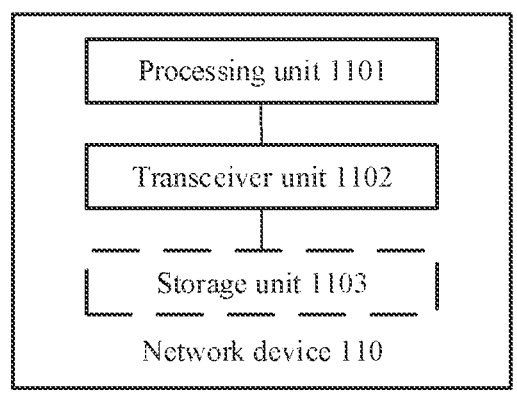
FIG. 11 is a schematic composition diagram of a network device according to an embodiment of this application.

FIG. 11 is a possible schematic structural diagram of a network device 110 in the foregoing embodiment. The network device 110 includes a processing unit 1101 and a transceiver unit 1102. Optionally, the network device 110 further includes a storage unit 1103.

The transceiver unit 1102 is configured to support the network device in communicating with another network entity, for example, communicating with the terminal shown in FIG. 2. In this embodiment of this application, the transceiver unit 1102 is specifically configured to receive a first RS and a second RS from a terminal, where both the first RS and the second RS are used to measure uplink CSI, and one or more antenna ports, of the terminal, corresponding to one or more RS ports included in the second RS are partially or completely the same as one or more antenna ports, of the terminal, corresponding to one or more RS ports included in the first RS.

The processing unit 1101 is configured to measure the uplink CSI based on the first RS and the second RS; the processing unit 1101 is configured to measure the uplink CSI based on the first RS; or the processing unit 1101 is configured to measure the uplink CSI based on the second RS. Optionally, the processing unit 1101 is further configured to send first indication information or second indication information to the terminal, where the first indication information is used to indicate an RS port that is included in the second RS and that corresponds to an RS port included in the first RS, and the second indication information is used to indicate whether a correspondence between the RS port included in the first RS and the RS port included in the second RS is enabled. In addition, the processing unit 1101 is further configured to perform an action performed by the network device in another process described in this embodiment of this application. The storage unit 1103 is configured to store program code and data of the network device, so that the processing unit 1101 performs an action corresponding to the network device in this embodiment of this application.

Figure 12:
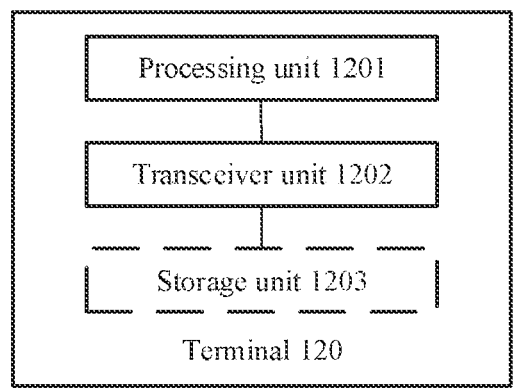
FIG. 12 is a schematic composition diagram of a terminal according to an embodiment of this application.

FIG. 12 is a possible schematic structural diagram of a terminal 120 in the foregoing embodiment. The terminal 120 includes a processing unit 1201 and a transceiver unit 1202. Optionally, the terminal 120 further includes a storage unit 1203.

The transceiver unit 1202 is configured to support the terminal in communicating with another network entity, for example, communicating with the network device shown in FIG. 2. In this embodiment of this application, the transceiver unit 1202 is specifically configured to receive first indication information or second indication information from the network device. The processing unit 1201 is specifically configured to send, on a same antenna port based on the first indication information or the second indication information, a first RS carried on a first resource and a second RS carried on a second resource. The first indication information is used to indicate an RS port that is included in the second RS and that corresponds to an RS port included in the first RS, and the second indication information is used to indicate whether a correspondence between the RS port included in the first RS and the RS port included in the second RS is enabled. The storage unit 1203 is configured to store program code and data of the terminal, so that the processing unit 1201 performs an action corresponding to the terminal in this embodiment of this application.

Figure 13:
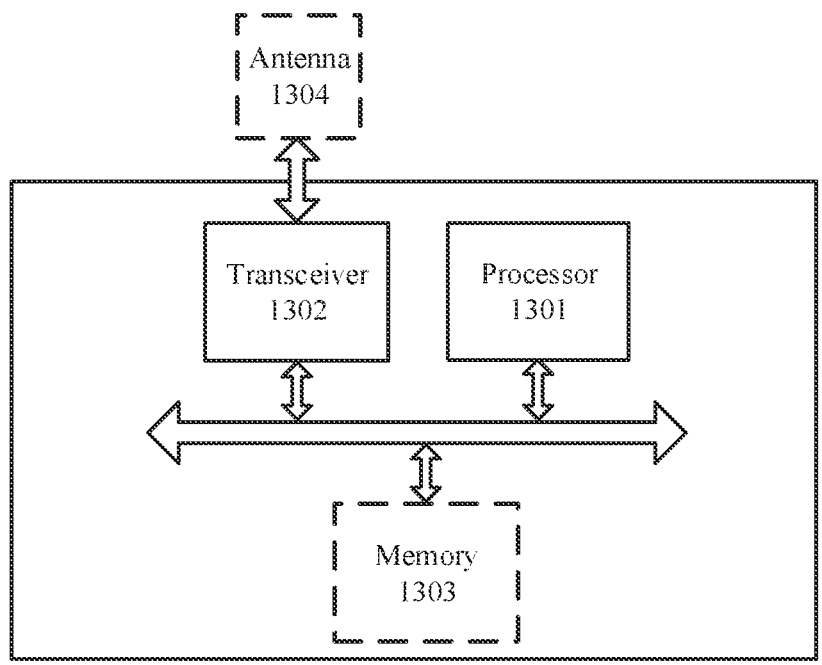
FIG. 13 is a schematic structural diagram of hardware of a network device according to an embodiment of this application.

This application further provides a schematic structural diagram of hardware of a network device (denoted as a network device 130) related to this embodiment of this application. As shown in FIG. 13, the network device 130 includes a processor 1301 and a transceiver 1302. Optionally, the network device 130 further includes a memory 1303.

The processor 1301, the transceiver 1302, and the memory 1303 communicate with each other by using an internal connection path to transfer a control signal, or a data signal, or a control signal and a data signal. The memory 1303 is configured to store a computer program. The processor 1301 is configured to invoke and run the computer program from the memory 1303, to control the transceiver 1302 to send and receive a signal.

The transceiver 1302 is specifically configured to receive a first RS and a second RS from a terminal, where both the first RS and the second RS are used to measure uplink CSI, and one or more antenna ports, of the terminal, corresponding to one or more RS ports included in the second RS are partially or completely the same as one or more antenna ports, of the terminal, corresponding to one or more RS ports included in the first RS.

The processor 1301 is specifically configured to measure the uplink CSI based on the first RS and the second RS, the processor 1301 is specifically configured to measure the uplink CSI based on the first RS, or the processor 1301 is specifically configured to measure the uplink CSI based on the second RS. Optionally, the processor 1301 is further configured to send first indication information or second indication information to the terminal, where the first indication information is used to indicate an RS port that is included in the second RS and that corresponds to an RS port included in the first RS, and the second indication information is used to indicate whether a correspondence between the RS port included in the first RS and the RS port included in the second RS is enabled. In addition, the processor 1301 is further configured to perform an action performed by the network device in another process described in this embodiment of this application. The memory 1303 is configured to store program code and data of the network device, so that the processor 1301 performs an action corresponding to the network device in this embodiment of this application.

The processor 1301 and the memory 1303 may be integrated into one processing apparatus. The processor 1301 is configured to execute program code stored in the memory 1303 to implement the foregoing functions. During specific implementation, the memory 1303 may also be integrated into the processor 1301, or may be independent of the processor 1301.

As shown in FIG. 13, the network device may further include an antenna 1304. The transceiver 1302 may receive the first RS and the second RS from the terminal through the antenna 1304, and may further send the first indication information or the second indication information to the terminal through the antenna 1304.

A function of the processor 1301 is the same as that of the processing unit 1101 in FIG. 11, a function of the transceiver 1302 is the same as that of the transceiver unit 1102 in FIG. 11, and a function of the memory 1303 is the same as that of the storage unit 1103 in FIG. 11.

The method provided in this embodiment of this application further provides a schematic structural diagram of hardware of a terminal. For example, the terminal may be a mobile phone, a tablet computer, a vehicle-mounted device, a wearable device, or a television. An Android system or another operating system may be installed on the terminal.

Figure 14:
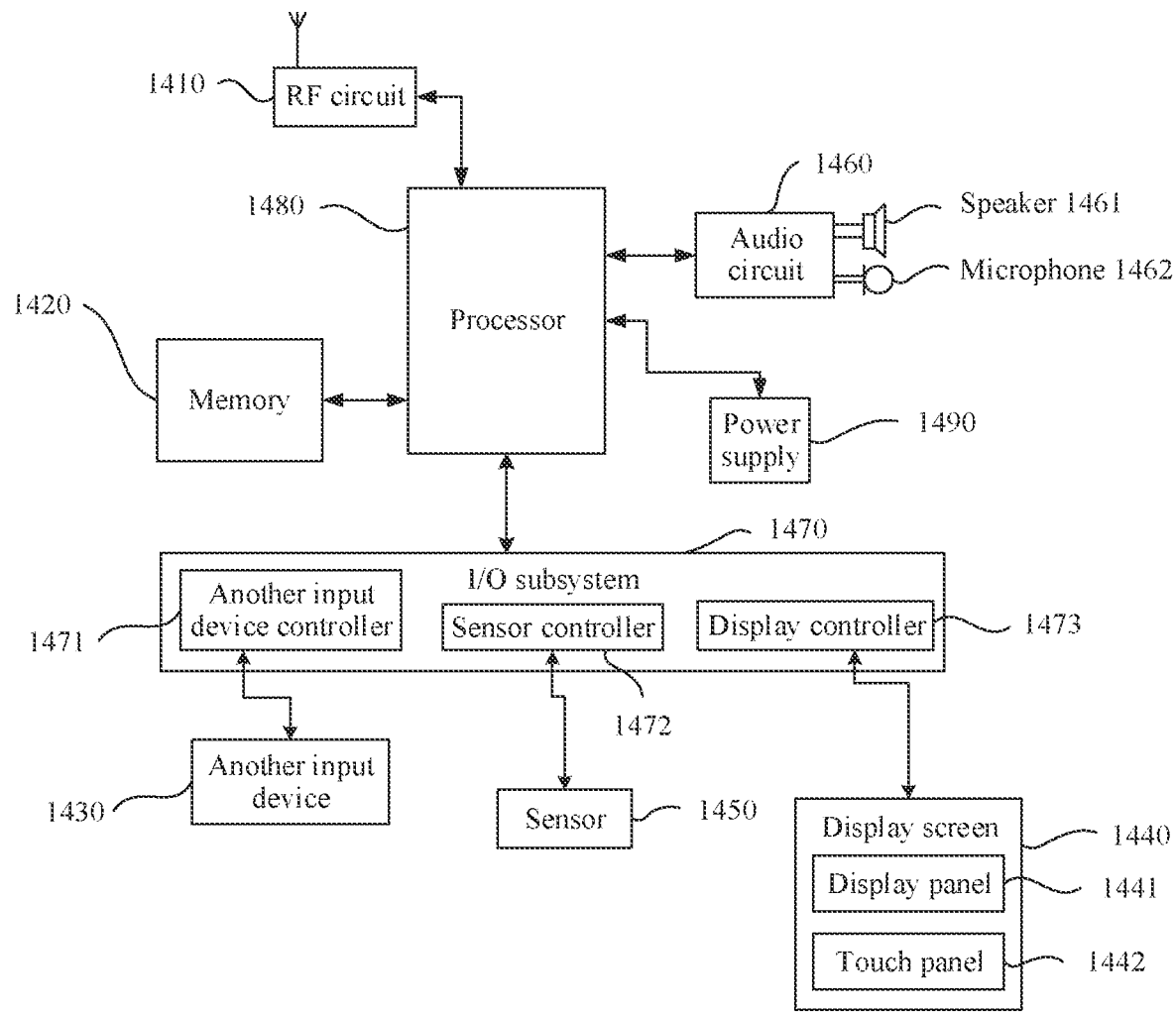
FIG. 14 is a schematic structural diagram of hardware of a terminal according to an embodiment of this application.

FIG. 14 is a schematic composition diagram of a hardware structure of a terminal (denoted as a terminal 140) related to an embodiment of this application. Referring to FIG. 14, the terminal 140 includes components such as a radio frequency (Radio Frequency, RF for short) circuit 1410, a memory 1420, another input device 1430, a display screen 1440, a sensor 1450, an audio circuit 1460, an I/O subsystem 1470, a processor 1480, and a power supply 1490. A person skilled in the art may understand that a structure of the terminal shown in FIG. 14 does not constitute a limitation on the terminal. The terminal may actually include more or fewer components than those shown in the figure, or combine some components, or split some components, or have different component arrangements. A person skilled in the art may understand that the display screen 1440 belongs to a user interface (user interface, UI for short), and the terminal 140 may include more or fewer user interfaces than those shown in the figure.

The following describes each composition part of the terminal 140 in detail with reference to FIG. 14.

The RF circuit 1410 may be configured to receive a signal and send a signal in an information sending and receiving process or a call process. Particularly, after receiving downlink information of the network device, the RF circuit 1410 sends the downlink information to the processor 1480 for processing, and sends uplink data to the network device. Usually, the RF circuit 1410 includes but is not limited to an antenna, at least one amplifier, a transceiver, a coupler, a low noise amplifier (Low Noise Amplifier, LNA for short), a duplexer, and the like. In addition, the RF circuit 1410 may further communicate with a network and another device through wireless communication. The wireless communication may use any communications standard or protocol, including but not limited to a global system for mobile communications (Global System of Mobile communication, GSM for short), a general packet radio service (General Packet Radio Service, GPRS for short), code division multiple access (Code Division Multiple Access, CDMA for short), wideband code division multiple access (Wideband Code Division Multiple Access, WCDMA for short), LTE, an e-mail, a short message service (Short Messaging Service, SMS), and the like.

The memory 1420 may be configured to store a software program and a module. The processor 1480 runs the software program and the module that are stored in the memory 1420, to perform various function applications of the terminal 140 and data processing. The memory 1420 may mainly include a program storage area and a data storage area. The program storage area may store an operating system, an application program required for at least one function (such as a voice playback function and an image playback function), and the like; and the data storage area may store data (such as audio data and a phone book) created according to the use of the terminal 140, and the like. In addition, the memory 1420 may include a high-speed random access memory, and may further include a nonvolatile memory, such as at least one magnetic disk storage component, a flash memory component, or another volatile solid-state storage component.

The another input device 1430 may be configured to receive input digit or character information, and generate key signal input related to user setting and function control of the terminal 140. Specifically, the another input device 1430 may include but is not limited to one or more of a physical keyboard, a function key (such as a volume control key or an on/off key), a tracking ball, a mouse, a joystick, an optical mouse (the optical mouse is a touch-sensitive surface that does not display visual output, or an extension of a touch-sensitive surface formed by a touchscreen), or the like. The another input device 1430 is connected to another input device controller 1471 of the I/O subsystem 1470, and performs signal interaction with the processor 1480 under control of the another input device controller 1471.

The display screen 1440 may be configured to display information input by a user or information provided for the user, and various menus of the terminal 140, and may further receive user input. Specifically, the display screen 1440 may include a display panel 1441 and a touch panel 1442. The display panel 1441 may be configured by using a liquid crystal display (Liquid Crystal Display, LCD for short), an organic light-emitting diode (Organic Light-Emitting Diode, OLED for short), or the like. The touch panel 1442 is also referred to as a touchscreen, a touch-sensitive screen, or the like, and may collect a contact or non-contact operation of the user on or near the touch panel 1442 (such as an operation of the user on or near the touch panel 1442 by using any suitable object such as a finger or a touch pen, or a motion sensing operation may be included, where the operation includes a single-point control operation, a multi-point control operation, and another type of operation), and drive a corresponding connection apparatus according to a preset program. Optionally, the touch panel 1442 may include two parts: a touch detection apparatus and a touch controller. The touch detection apparatus detects a touch orientation and gesture of the user, detects a signal brought by the touch operation, and sends the signal to the touch controller. The touch controller receives touch information from the touch detection apparatus, converts the touch information into information that can be processed by the processor, then sends the information to the processor 1480, and can receive and execute a command sent by the processor 1480. In addition, the touch panel 1442 may be implemented in a plurality of types, such as a resistive type, a capacitive type, an infrared type, and a surface acoustic wave type, or the touch panel 1442 may be implemented by using any technology to be developed in the future. Further, the touch panel 1442 may cover the display panel 1441. The user may perform, based on content (the displayed content includes, but is not limited to, a soft keyboard, a virtual mouse, a virtual key, an icon, and the like) displayed on the display panel 1441, an operation on or near the touch panel 1442 covering the display panel 1441. After detecting the operation on or near the touch panel 1442, the touch panel 1442 transfers the operation to the processor 1480 by using the I/O subsystem 1470, to determine the user input. Subsequently, the processor 1480 provides a corresponding visual output on the display panel 1441 by using the I/O subsystem 1470 based on the user input. Although in FIG. 14, the touch panel 1442 and the display panel 1441 are used as two independent components to implement input and output functions of the terminal 140, in some embodiments, the touch panel 1442 and the display panel 1441 may be integrated to implement the input and output functions of the terminal 140.

The terminal 140 may further include at least one sensor 1450 such as an optical sensor, a motion sensor, and another sensor. Specifically, the optical sensor may include an ambient optical sensor and a proximity sensor. The ambient optical sensor may adjust luminance of the display panel 1441 according to brightness of ambient light. The proximity sensor may turn off the display panel 1441, or turn off backlight, or turn off the display panel 1441 and backlight when the terminal 140 moves to an ear. As a motion sensor, an accelerometer sensor may detect acceleration values in all directions (usually on three axes), may detect a value and a direction of gravity when the accelerometer sensor is stationary, and may be used in an application for identifying a mobile phone posture (such as landscape-to-portrait switching, a related game, and magnetometer posture calibration), a function related to vibration identification (such as a pedometer or a knock), or the like. Other sensors such as a gyroscope, a barometer, a hygrometer, a thermometer, and an infrared sensor may be configured the terminal 140, and details are not described herein.

The audio circuit 1460, the speaker 1461, and the microphone 1462 may provide an audio interface between the user and the terminal 140. The audio circuit 1460 may convert received audio data into a signal and transmit the signal to the speaker 1461. The speaker 1461 converts the signal into a sound signal for output. On the other hand, the microphone 1462 converts a collected sound signal into a signal. The audio circuit 1460 receives the signal and converts the signal into audio data, and outputs the audio data to the RF circuit 1410 to send the audio data to another device (for example, another mobile phone), or outputs the audio data to the memory 1420 for further processing.

The I/O subsystem 1470 is configured to control input and output peripheral devices, and may include the another input device controller 1471, a sensor controller 1472, and a display controller 1473. Optionally, the one or more other input control device controllers 1471 receive a signal from the another input device 1430, or send a signal to the another input device 1430, or receive a signal from the another input device 1430 and send a signal to the another input device 1430, the another input device 1430 may include a physical button (such as a press button or a rocker button), a dial pad, a sliding switch, a joystick, a click scroll wheel, and an optical mouse. It should be noted that the another input device controller 1471 may be connected to any one or more of the foregoing devices. The display controller 1473 in the I/O subsystem 1470 receives a signal from the display screen 1440, sends a signal to the display screen 1440, or receives a signal from the display screen 1440 and sends a signal to the display screen 1440. After the display screen 1440 detects user input, the display controller 1473 converts the detected user input into interaction with a user interface object displayed on the display screen 1440, to implement human-computer interaction. The sensor controller 1472 may receive a signal from one or more sensors 1450, send a signal to one or more sensors 1450, or receive a signal from one or more sensors 1450 and send a signal to one or more sensors 1450.

The processor 1480 is a control center of the terminal 140, and is connected to each part of the entire mobile phone through various interfaces and lines. The processor 1480 runs or executes a software program, or a module, or a software program and a module that are stored in the memory 1420, invokes data stored in the memory 1420, and performs various functions and data processing of the terminal 140, to perform overall monitoring on the mobile phone. Optionally, the processor 1480 may include one or more processing units. Optionally, the processor 1480 may integrate an application processor and a modem processor. The application processor mainly processes an operating system, a user interface, an application program, and the like. The modem processor mainly processes wireless communication. It can be understood that the modem processor may not be integrated into the processor 1480.

The terminal 140 further includes the power supply 1490 (such as a battery) that supplies power to various components. Optionally, the power supply may be logically connected to the processor 1480 by using a power management system, to implement functions such as charging management, discharging management, and power consumption by using the power management system.

Although not shown in the figure, the terminal 140 may further include a camera, a Bluetooth module, and the like. Details are not described herein.

When the terminal 140 performs the method provided in this embodiment of this application, the RF circuit 1410 is specifically configured to receive first indication information or second indication information from a network device. The processor 1480 is specifically configured to send, on a same antenna port based on the first indication information or the second indication information, a first RS carried on a first resource and a second RS carried on a second resource. The first indication information is used to indicate an RS port that is included in the second RS and that corresponds to an RS port included in the first RS, and the second indication information is used to indicate whether a correspondence between the RS port included in the first RS and the RS port included in the second RS is enabled. The memory 1420 is configured to store program code and data of the terminal, so that the processor 1480 performs an action corresponding to the terminal in this embodiment of this application.

A function of the processor 1480 is the same as that of the processing unit 1201 in FIG. 12, a function of the RF circuit 1410 is the same as that of the transceiver unit 1202 in FIG. 12, and a function of the memory 1420 is the same as that of the storage unit 1203 in FIG. 12.

An embodiment of this application further provides a computer-readable storage medium, including instructions. When the instructions are run on a computer, the computer is enabled to perform the foregoing methods.

An embodiment of this application further provides a computer program product including instructions. When the computer program product runs on a computer, the computer is enabled to perform the foregoing methods.

An embodiment of this application further provides a system. The system includes the network device and the terminal in the foregoing embodiments.

An embodiment of this application further provides an apparatus, the apparatus exists in a product form of a chip. The apparatus includes a processor, a memory, and a transceiver component. The transceiver component includes an input/output circuit. The memory is configured to store computer-executable instructions. The processor executes the computer-executable instructions stored in the memory, to implement the foregoing methods. In this case, the method provided in the embodiments of this application may be performed by a chip.

All or some of the foregoing embodiments may be implemented through software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive (solid state disk, SSD for short)), or the like.

Although this application is described with reference to the embodiments, in a process of implementing this application that claims protection, a person skilled in the art may understand and implement another variation of the disclosed embodiments by viewing the appended drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clear that, a person skilled in the art can make various modifications and variations to this application without departing from the spirit and scope of this application. This application is intended to cover the modifications and variations of this application provided that they fall within the scope of the following claims and equivalent technologies of this application.

What is claimed is:

1. A communications apparatus, comprising at least one processor and one or more memories, wherein the one or more memories are coupled to the at least one processor and store programming instructions for execution by the at least one processor to:
    send first indication information to a terminal, wherein the first indication information indicates a second reference signal (RS) port in a second RS that corresponds to a first RS port in a first RS, the first RS port in the first RS and the second RS port in the second RS use a same antenna port of the terminal, the first indication information indicates a first antenna port identifier corresponding to the first RS port in the first RS and a second antenna port identifier corresponding to the second RS port in the second RS, and the first antenna port identifier is same as the second antenna port identifier;
    in response to sending the first indication information to the terminal, receive the first RS and the second RS from the terminal, wherein both the first RS and the second RS are used to measure uplink channel state information (CSI), and wherein one or more antenna ports, of the terminal, corresponding to one or more RS ports comprised in the second RS are at least partially the same as one or more antenna ports, of the terminal, corresponding to one or more RS ports comprised in the first RS;
    select one or two RSs from the first RS and the second RS to measure the uplink CSI; and
    measure the uplink CSI based on the selected one or two RSs.

2. The apparatus according to claim 1, wherein the one or more antenna ports, of the terminal, corresponding to one or more RS ports comprised in the second RS are at least partially the same as one or more antenna ports, of the terminal, corresponding to one or more RS ports comprised in the first RS specifically comprises:
  at least one RS port comprised in the second RS respectively corresponds to at least one RS port comprised in the first RS, wherein two RS ports that have a correspondence correspond to a same antenna port of the terminal.

3. The apparatus according to claim 2, wherein:
the one or more memories store the programming instructions for execution by the at least one processor further to send second indication information to the terminal, wherein the second indication information is used to indicate whether a correspondence between an RS port comprised in the first RS and an RS port comprised in the second RS is enabled.

4. The apparatus according to claim 1, wherein the one or more antenna ports, of the terminal, corresponding to the one or more RS ports comprised in the second RS are completely the same as the one or more antenna ports, of the terminal, corresponding to the one or more RS ports comprised in the first RS.

5. The apparatus according to claim 4, wherein the one or more antenna ports, of the terminal, corresponding to the one or more RS ports comprised in the second RS are completely the same as the one or more antenna ports, of the terminal, corresponding to the one or more RS ports comprised in the first RS specifically comprises:
  all the RS ports comprised in the second RS respectively correspond to all the RS ports comprised in the first RS, wherein two RS ports that have a correspondence correspond to a same antenna port of the terminal.

6. The apparatus according to claim 1, wherein the apparatus is a network device.

7. A channel state information (CSI) measurement method, comprising:
  receiving, by a terminal, first indication information from a network device, wherein the first indication information indicates a second reference signal (RS) port in a second RS that corresponds to a first RS port in a first RS, wherein the first RS port in the first RS and the second RS port in the second RS use a same antenna port of the terminal, wherein the first indication information indicates a first antenna port identifier corresponding to the first RS port in the first RS and a second antenna port identifier corresponding to the second RS port in the second RS, and the first antenna port identifier is same as the second antenna port identifier, and wherein the first RS and the second RS are selected for use in measuring uplink CSI; and
  in response to receiving the first indication information, sending, by the terminal on the same antenna port based on the first indication information, the first RS carried on a first resource and the second RS carried on a second resource, wherein the first resource is a time-frequency resource occupied by the first RS port comprised in the first RS, and the second resource is a time-frequency resource occupied by the second RS port that is comprised in the second RS and that corresponds to the first RS port comprised in the first RS.

8. The method according to claim 7, wherein at least one RS port comprised in the second RS respectively corresponds to at least one RS port comprised in the first RS.

9. The method according to claim 7, wherein all RS ports comprised in the second RS respectively correspond to all RS ports comprised in the first RS.

10. The method according to claim 7, wherein one or more types of resources, comprising a time domain resource, a frequency domain resource, and a code domain resource, occupied by one or more RS ports comprised in the first RS are different from one or more types of resources occupied by one or more RS ports comprised in the second RS.

11. The method according to claim 7, wherein a quantity of resource elements (REs) occupied by one or more RS ports comprised in the second RS is less than or equal to a quantity of REs occupied by one or more RS ports comprised in the first RS.

12. The method according to claim 7, wherein the second RS performs frequency hopping in different time units at a frequency-domain granularity.

13. A communications apparatus, comprising at least one processor and one or more memories, wherein the one or more memories are coupled to the at least one processor and store programming instructions for execution by the at least one processor to:
  receive first indication information from a network device, wherein the first indication information indicates a second reference signal (RS) port in a second RS that corresponds to a first RS port in a first RS, wherein the first RS port in the first RS and the second RS port in the second RS use a same antenna port of a terminal, wherein the first indication information indicates a first antenna port identifier corresponding to the first RS port in the first RS and a second antenna port identifier corresponding to the second RS port in the second RS, and the first antenna port identifier is same as the second antenna port identifier, and wherein the first RS and the second RS are selected for use in measuring uplink channel state information (CSI); and
  in response to receiving the first indication information, send, on the same antenna port based on the first indication information, the first RS carried on a first resource and the second RS carried on a second resource, wherein the first resource is a time-frequency resource occupied by the first RS port comprised in the first RS, and the second resource is a time-frequency resource occupied by the second RS port that is comprised in the second RS and that corresponds to the first RS port comprised in the first RS.

14. The apparatus according to claim 13, wherein at least one RS port comprised in the second RS respectively corresponds to at least one RS port comprised in the first RS.

15. The apparatus according to claim 13, wherein all RS ports comprised in the second RS respectively correspond to all RS ports comprised in the first RS.

16. The apparatus according to claim 13, wherein one or more types of resources, comprising a time domain resource, a frequency domain resource, and a code domain resource, occupied by one or more RS ports comprised in the first RS are different from one or more types of resources occupied by one or more RS ports comprised in the second RS.

17. The apparatus according to claim 13, wherein a quantity of resource elements (REs) occupied by one or more RS ports comprised in the second RS is less than or equal to a quantity of REs occupied by one or more RS ports comprised in the first RS.

18. The apparatus according to claim 13, wherein the second RS performs frequency hopping in different time units at a frequency-domain granularity.

19. The apparatus according to claim 13, wherein the apparatus is a terminal device.

* * * * *

UNITED STATES PATENT AND TRADEMARK OFFICE
CERTIFICATE OF CORRECTION

PATENT NO. : 12,244,379 B2
APPLICATION NO. : 17/343200
DATED : March 4, 2025
INVENTOR(S) : Ye Wu and Xiaoyan Bi Page 1 of 1

It is certified that error appears in the above-identified patent and that said Letters Patent is hereby corrected as shown below:

In the Claims

In Column 31, In Line 64, In Claim 9, delete "accordingto" and insert -- according to --.

Signed and Sealed this
Twenty-second Day of July, 2025

Coke Morgan Stewart
*Acting Director of the United States Patent and Trademark Office*